US012015836B2

United States Patent
Maddox et al.

(10) Patent No.: US 12,015,836 B2
(45) Date of Patent: Jun. 18, 2024

(54) WORK VEHICLE PERCEPTION SYSTEMS AND FRONT MODULES

(71) Applicant: Deere & Company, Moline, IL (US)

(72) Inventors: Troy K. Maddox, LeClaire, IA (US); Jordan L. Zerr, Cedar Falls, IA (US); Tyler Niday, Santa Cruz, CA (US); Jeffrey E. Runde, Cedar Falls, IA (US); Margaux M. Ascherl, Adel, IA (US)

(73) Assignee: DEERE & COMPANY, Moline, IL (US)

( * ) Notice: Subject to any disclaimer, the term of this patent is extended or adjusted under 35 U.S.C. 154(b) by 320 days.

(21) Appl. No.: 17/466,143

(22) Filed: Sep. 3, 2021

(65) Prior Publication Data

US 2022/0150392 A1 May 12, 2022

Related U.S. Application Data

(60) Provisional application No. 63/111,687, filed on Nov. 10, 2020.

(51) Int. Cl.
*H04N 23/52* (2023.01)
*B60K 11/08* (2006.01)
(Continued)

(52) U.S. Cl.
CPC ............ *H04N 23/52* (2023.01); *B60K 11/08* (2013.01); *B60R 11/04* (2013.01); *B62D 33/06* (2013.01);
(Continued)

(58) Field of Classification Search
USPC ....................................................... 348/118
See application file for complete search history.

(56) References Cited

U.S. PATENT DOCUMENTS 3,700,256 A 10/1972 Jones, Jr.
5,630,469 A 5/1997 Butterbaugh et al.
(Continued)

FOREIGN PATENT DOCUMENTS

DE 102015115883 A1 3/2017
DE 102018217570 A1 4/2020
(Continued)

OTHER PUBLICATIONS

John Deere, The Future of Farming Technology, https://www.deere.co.uk/en/agriculture/future-of-farming/, undated, admitted prior art (6 pages).
(Continued)

*Primary Examiner* — Nigar Chowdhury
(74) *Attorney, Agent, or Firm* — KLINTWORTH & ROZENBLAT IP LLP

(57) ABSTRACT

A front perception module is utilized in conjunction with a front ballast system, which is included in a work vehicle and which has a laterally-extending hanger bracket supporting a number of removable ballast weights. In various embodiments, the front perception module includes an environmental depth perception (EDP) sensor system including a first EDP device having a field of view (FOV) encompassing an environmental region forward of the work vehicle, a mounting base attached to the work vehicle, and a front module housing containing the EDP sensor system and joined to the work vehicle through the mounting base. The front module housing is positioned over and vertically spaced from the laterally-extending hanger bracket in a manner enabling positioning of the removable ballast weights beneath the front module housing.

20 Claims, 14 Drawing Sheets

(51) Int. Cl.
  *B60R 11/04* (2006.01)
  *B62D 33/06* (2006.01)
  *B62D 49/06* (2006.01)
  *G03B 17/55* (2021.01)
  *H04N 13/243* (2018.01)
  *H04N 23/51* (2023.01)
  *B60R 11/00* (2006.01)
  *B60R 19/52* (2006.01)

(52) U.S. Cl.
  CPC ......... *B62D 49/0628* (2013.01); *G03B 17/55* (2013.01); *H04N 13/243* (2018.05); *H04N 23/51* (2023.01); *B60R 2011/004* (2013.01); *B60R 2019/525* (2013.01); *H04N 2213/001* (2013.01)

(56) References Cited

U.S. PATENT DOCUMENTS

| | | | |
|---|---|---|---|
| 10,875,589 | B2 | 12/2020 | Letscher et al. |
| 11,315,258 | B1* | 4/2022 | Anagnostopoulos ........................ A01B 69/001 |
| 2017/0046578 | A1* | 2/2017 | Phillips .............. G02B 27/0179 |
| 2018/0127027 | A1* | 5/2018 | Brennan ................ B62D 13/06 |
| 2018/0188032 | A1 | 7/2018 | Ramanandan et al. |
| 2019/0154799 | A1 | 5/2019 | Schmidt |
| 2019/0204845 | A1* | 7/2019 | Grossman ............. G01S 17/931 |
| 2019/0317521 | A1 | 10/2019 | Nishi et al. |
| 2020/0077540 | A1* | 3/2020 | Yen ......................... G01S 7/497 |
| 2020/0077564 | A1* | 3/2020 | Boydens .............. A01B 69/004 |
| 2020/0386860 | A1 | 12/2020 | Chung |
| 2021/0016286 | A1* | 1/2021 | Swanson ................... G01N 1/04 |
| 2021/0024144 | A1* | 1/2021 | Patnaik ........... B60W 30/18109 |
| 2021/0034867 | A1* | 2/2021 | Ferrari ................. A01B 69/001 |
| 2021/0153420 | A1* | 5/2021 | Smith .................. A01B 79/005 |
| 2021/0181737 | A1* | 6/2021 | Patnaik ................ G05D 1/0055 |
| 2021/0201528 | A1* | 7/2021 | Yuasa ....................... G06T 7/73 |
| 2021/0339699 | A1* | 11/2021 | Adams ................... B60R 21/34 |
| 2021/0383269 | A1* | 12/2021 | Zhou ....................... G06N 3/045 |
| 2021/0383318 | A1* | 12/2021 | Patnaik ................ G06Q 10/083 |
| 2022/0043157 | A1* | 2/2022 | Chen ..................... G01S 17/894 |
| 2022/0078314 | A1* | 3/2022 | Roth ....................... H04N 23/66 |
| 2023/0379593 | A1* | 11/2023 | Nie ....................... G01S 13/865 |

FOREIGN PATENT DOCUMENTS

| | | |
|---|---|---|
| DE | 102019105339 A1 | 9/2020 |
| WO | WO2018156616 A1 | 8/2018 |

OTHER PUBLICATIONS

Case IH Unveils Autonomous Concept Tractor, https://www.agriculture.com/news/machinery/case-ih-unveils-autonomous-concept-tractor, Aug. 31, 2016 (8 pages).

New Holland, The Future of Agriculture Could Rest With Self Driving Tractors, New Holland's Autonomous Concept Tractor—https://www.forbes.com/sites/jenniferhicks/2016/08/30/the-future-of-agriculture-could-rest-with-self-driving-tractors/?sh=6bdd0c13559a, 2016 (3 pages).

Smart AG, Plowing AI, Startup Retrofits Tractors with Autonomy—https://blogs.nvidia.com/blog/2019/05/21/smart-ag-retrofits-tractors-with-ai-jetson-autonomy/, May 21, 2019 (11 pages).

Waymo, Introducing Waymo's Suite of Custom-Built, Self-Driving Hardware, https://blog.waymo.com/2019/08/introducing-waymos-suite-of-custom.html, Waypoint—The Official Waymo Blog, Feb. 15, 2017 (6 pages).

Tesla Backup Cameras, Reverse Engineered: Sony CIS Inside Denso Automotive Camera, Tesla Model 3 Triple Camera, Samsung Galaxy Note 10+ ToF Camera, http://www.f4news.com/2020/01/21/reverse-engineered-sony-cis-inside-denso-automotive-camera-tesla-model-3-triple-camera-samsung-galaxy-note-10-tof-camera/, Jan. 21, 2020 (4 pages).

IVT International, John Deere Offers Holistic Future Vision at Agritechnica—Including 'VoloDrone' Sprayer, https://www.ivtinternational.com/news/agriculture/john-deere-rocking-the-future-at-agritechnica.html, Nov. 12, 2019 (4 pages).

Youtube, The Best John Deere Innovation 2019/2020—TractorLab, Autonomous Tractor Future of Farming, https://www.youtube.com/watch?v=idc0G8YQBZA, 2019-2020 (2 pages).

Extended European Search Report and Written Opinion issued in European Patent Application No. 21203174.4, dated Mar. 24, 2022, in 08 pages.

Extended European Search Report and Written Opinion issued in European Patent Application No. 21203178.5, dated Mar. 17, 2022, in 13 pages.

USPTO Non-Final Office Action issued in U.S. Appl. No. 17/466,215, Apr. 25, 2024, 36 pages.

* cited by examiner

WORK VEHICLE PERCEPTION SYSTEMS AND FRONT MODULES

CROSS-REFERENCE TO RELATED APPLICATION(S)

This application claims priority to U.S. provisional application Ser. No. 63/111,687, filed with the United Stated Patent and Trademark Office on Nov. 10, 2020.

STATEMENT OF FEDERALLY SPONSORED RESEARCH OR DEVELOPMENT

Not applicable.

FIELD OF THE DISCLOSURE

This disclosure relates to work vehicle perception modules providing various advantages, including thermal performance and structural integration benefits, as well as to work vehicle perception systems containing such modules.

BACKGROUND OF THE DISCLOSURE

As appearing herein, the term "work vehicle perception module" refers to a structural assembly containing one or more environmental depth perception (EDP) devices, which are configured to monitor three dimensional (3D) characteristics of a work vehicle's external environmental. The data gathered by the EDP devices within a work vehicle perception module may be utilized to support, for example, navigation, obstacle detection, or environment mapping functions. Examples of such EDP devices include radar, lidar, and sonar-based sensors, with lidar-based sensors commonly utilized in the context of work vehicle perception systems. In certain cases, stereoscopic camera assemblies are employed as vision-based EDP devices, which enable environmental depth assessment by correlating imagery contained within video feeds captured by twin cameras spaced by a fixed distance. Relative to other types of EDP devices, stereoscopic camera assemblies may provide higher resolutions and other advantages, which render stereoscopic camera assemblies particularly well-suited for usage in autonomous and semi-autonomous work vehicle applications. These benefits notwithstanding, EDP sensors systems incorporating stereoscopic camera assemblies encounter certain unique technical challenges, such as high visual processing demands and associated thermal dissipation constraints, which existing work vehicle integration schemes fail to address in an adequate or comprehensive sense. An ongoing industrial needs thus persists for improved manners by which work vehicles can be equipped with EDP systems, such as vision-based EDP systems including stereoscopic camera assemblies.

SUMMARY OF THE DISCLOSURE

Embodiments of a front perception module are utilized in conjunction with a front ballast system, which is included in a work vehicle and which has a laterally-extending hanger bracket supporting a number of removable ballast weights. In various embodiments, the front perception module includes an environmental depth perception (EDP) sensor system including a first EDP device having a field of view (FOV) encompassing an environmental region forward of the work vehicle, a mounting base attached to the work vehicle, and a front module housing containing the EDP sensor system and joined to the work vehicle through the mounting base. The front module housing is positioned over and vertically spaced from the laterally-extending hanger bracket in a manner enabling positioning of the removable ballast weights beneath the front module housing.

Further disclosed are embodiments of a work vehicle perception system utilized onboard a work vehicle having a work vehicle chassis. In at least some implementations, the work vehicle perception system includes front perception module and a front ballast system, which is joined to the work vehicle chassis and which contains a laterally-extending hanger bracket configured to support a plurality of ballast weights. The front perception module includes, in turn, a front module housing, a mounting base coupling the front module housing to the work vehicle chassis through the front ballast system, and a first plurality of stereoscopic camera assemblies contained in the front module housing. The first plurality of stereoscopic camera assemblies is distributed about a peripheral portion of the front module housing to provide a cumulative forward-centered FOV equal to or greater than 180 degrees, as seen looking downwardly onto the work vehicle.

The details of one or more embodiments are set-forth in the accompanying drawings and the description below. Other features and advantages will become apparent from the description, the drawings, and the claims.

BRIEF DESCRIPTION OF THE DRAWINGS

At least one example of the present disclosure will hereinafter be described in conjunction with the following figures.

Figure 1:
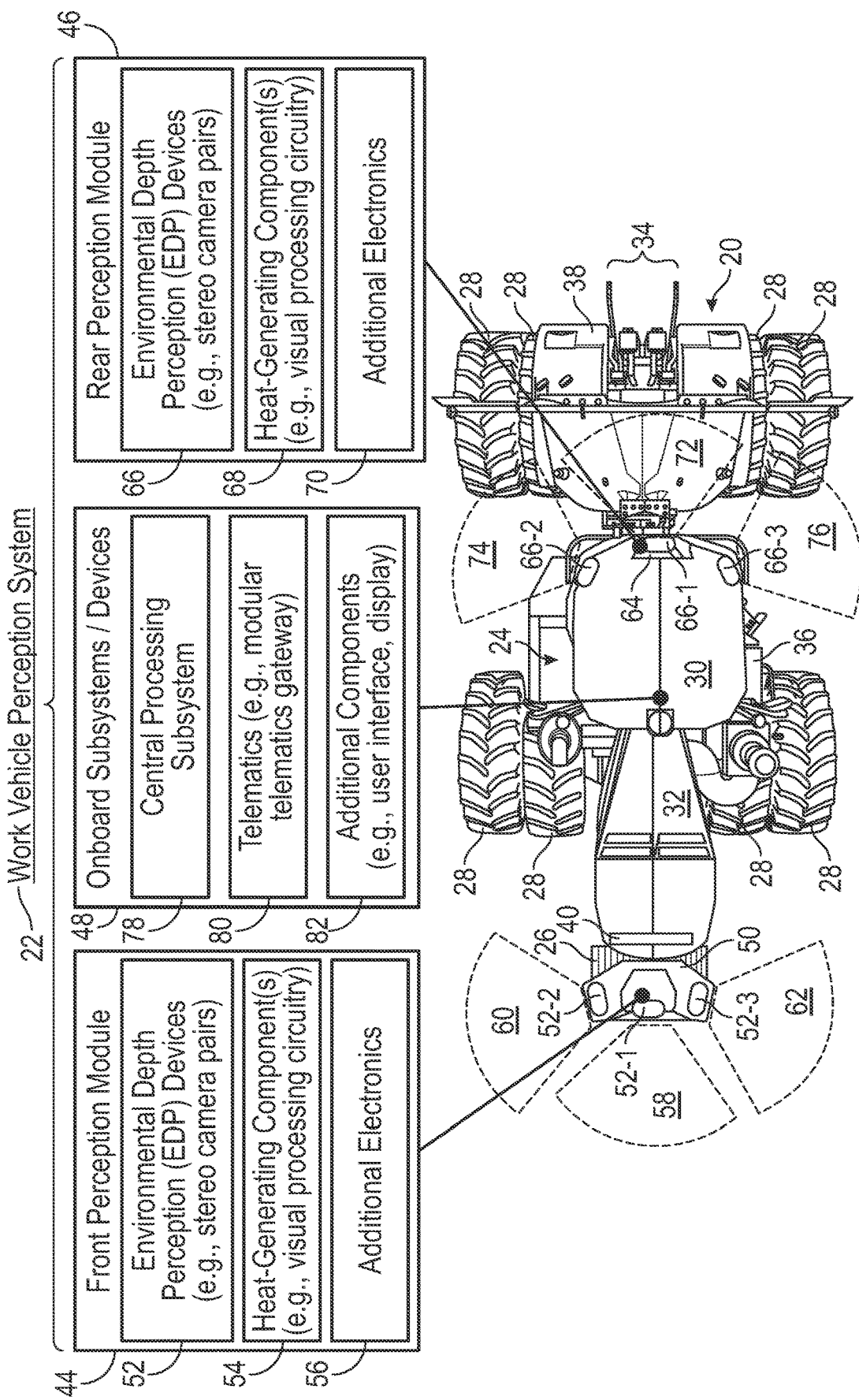
FIG. 1 illustrates a work vehicle (a tractor shown in top view) equipped with a work vehicle perception system (shown as a schematic) including front and rear perception modules, as presented in accordance with an example embodiment of the present disclosure.

Like reference symbols in the various drawings indicate like elements. For simplicity and clarity of illustration, descriptions and details of well-known features and techniques may be omitted to avoid unnecessarily obscuring the example and non-limiting embodiments of the invention described in the subsequent Detailed Description. It should further be understood that features or elements appearing in the accompanying figures are not necessarily drawn to scale unless otherwise stated.

DETAILED DESCRIPTION

Embodiments of the present disclosure are shown in the accompanying figures of the drawings described briefly above. Various modifications to the example embodiments may be contemplated by one of skill in the art without departing from the scope of the present invention, as set-forth the appended claims. As appearing herein, the term "module" refers generally to a system or electronics-containing assembly adapted for installation on a tractor or other work vehicle.

Overview

The following describes front and rear work vehicle perception modules for usage in conjunction with tractors and other work vehicles, such work vehicles equipped with front ballast systems and/or work vehicles capable of autonomous (or semi-autonomous) operation. The front and rear work vehicle perception modules provide certain structural integration, mechanical protection, and thermal performance advantages, as described throughout this document. The below-described work vehicle perception modules are consequently well-suited for usage in conjunction with environmental depth perception (EDP) sensor systems, which often contain electronic (e.g., processing) components prone to excess heat generation during system operation. In this regard, embodiments of the front and rear work vehicle perception modules are beneficially utilized to deploy EDP sensor systems containing EDP sensors or devices, which monitor the three dimensional (3D) spatial characteristics of a work vehicle's exterior environment to support any number and type of functions, such as navigation, obstacle detection, and/or spatial mapping functions. Further, embodiments of the front and rear work vehicle perception modules may be particularly well-suited for usage in conjunction with vision-based EDP sensor systems, which contain EDP devices in the form of stereoscopic camera assemblies and associated visual processing circuitry (e.g., VPUs) subject to high processing demands and prone to excess heat during module operation.

Discussing first the front perception module or pod in greater detail, embodiments of the front perception module may be mounted to the chassis of a tractor or other work vehicle at a location adjacent a front ballast system. For example, in at least some embodiments, the front perception module may be mounted to the work vehicle chassis through the front ballast system and, in at least some instances, may be rigidly or fixedly joined to a laterally-extending hanger bracket included in the front ballast system. In various implementations, the front perception module includes a front module housing containing an EDP sensor system, with the front module housing rigidly mounted or joined to the laterally-extending hanger bracket through a base structure or "mounting base." The front module housing may be positioned, dimensioned, and shaped to extend substantially parallel to the laterally-extending hanger bracket at an elevation above the hanger bracket, thereby accommodating the manual positioning of removable ballast weights beneath the front module housing. In certain implementations, at least some portion, if not the entirety of the mounting base may be integrally formed with the laterally-extending hanger bracket as, for example, a single (e.g., cast) piece or unitary structure. In this case, the upper surface of the mounting base may define a platform or mounting surface on which the front module housing may seat and to which the front module housing may be secured; e.g., by attachment with bolts or other fasteners.

In other instances, the mounting base may be separately fabricated and structurally configured (sized and shaped) to engage into the laterally-extending hanger bracket to allow attachment of the front perception module via retrofit installation. For example, in this latter instance, the mounting base may be fabricated to include one or more mounting flanges, which extend from the front module housing in a downward direction to engage or hook into the laterally-extending hanger bracket. In such implementations, the mounting flanges may be imparted with C-shaped geometries, as viewed from a side of the front perception module, and include slots opening toward the laterally-extending hanger bracket when the front perception module is properly oriented with respect to the front ballast system of the work vehicle. Further, the flange slots may be shaped and dimensioned to enable mating or close-fit installation of the mounting base onto the laterally-extending hanger bracket; e.g., by fitting the mounting flanges into engagement with the hanger bracket and subsequently securing the flanges in their desired position utilizing fasteners, by welding, or via another attachment technique. In still other instances, the mounting base may include features, such as railing or an attachment bracket, which extends downwardly from a support platform to connect to the work vehicle chassis, whether in a direct manner or through the front ballast system. In such embodiments, the housing of the front perception module may be mounted to the support platform, which may be positioned at an elevation above the laterally-extending hanger bracket, and thus vertically spaced therefrom, to allow the positioning of removable ballast weights beneath the support platform and the front module housing when the ballast weights are loaded onto the laterally-extending hanger bracket. In still further implementations, the front perception module may be mounted to the mounted to the front ballast system, or mounted directly to a work vehicle chassis positioned immediately above the front ballast system, in various other manners as described below.

When applicable, joinder of the front perception module to the laterally-extending hanger bracket of a front ballast system (whether by direct integration, by retrofit installation, or otherwise by fixedly attaching the front module housing to the hanger bracket in some manner) provides several advantages, including the provision of a rigid attachment of the front module housing to the work vehicle chassis. Such a rigid mounting scheme minimizes vibrational disturbances otherwise be transmitted to the module sensors or EDP devices (e.g., stereoscopic camera assemblies) contained in EDP sensor system to improve sensor performance during work vehicle operation and travel of the work vehicle over rough terrain. Additional benefits may include positioning of the module sensors (EDP devices) at a generally optimal ground height or vertical elevation to minimize exposure of the front perception module to dust and debris, at a forwardmost point of the work vehicle (as particularly beneficial when the front perception module contains one or more stereoscopic camera assemblies), and at location providing little to no (nominal) obstruction of operator sightlines when a human operator is present within the work vehicle cabin.

In embodiments, joinder of the front perception module to the front ballast system further affords robust mechanical protection to the front perception module in embodiments by, for example, recessing the leading edges of the front module housing relative to the leading edges of the front ballast system; and/or recessing the side edges of the front module housing relative to the side edges of the hanger bracket. The likelihood of damage to the EDP sensor system, which often contains relatively sensitive and costly componentry, is consequently minimized in the unlikely event of collision with an object located forward of the work vehicle. Finally, as a still further benefit, joinder of the front perception module to the front ballast system enables positioning of the EDP sensors or devices in a manner providing a broad angle cumulative sensor FOV; e.g., in embodiments, a cumulative sensor FOV approaching or exceeding 180° can be achieved by, for example, strategically positioning multiple (e.g., three) stereoscopic camera pairs (or other EDP devices) about an inner periphery of the front module housing, as described below.

Embodiments of the below-described front perception module provide thermal performance or heat dissipation benefits, as well. To this end, the front perception module may incorporate features facilitating airflow through the front module housing along one or more cooling airflow paths as the work vehicle remains stationary or travels in a forward direction. The internal layout or architecture of the front perception module and the routing of such cooling airflow paths may be designed such that airflow conducted along the cooling airflow paths impinges one or more heat-generating components within the front perception module (e.g., a VPU or other visual processing circuitry prone to excess heat generation) to boost the heat rejection capabilities of the front perception module, optimizing the operation and prolonging the lifespan of the EDP sensor system. Such airflow enhancement features can include, for example, airflow vents for receiving and exhausting ram airflow during work vehicle forward motion or in the presence of headwinds, as well as certain vertical duct features (e.g., the below-described convective chimney) promoting passive cooling airflow through the front perception module in an essentially upward or vertical direction. Positioning of the front perception module, and corresponding airflow enhancement features of the front perception module, may leverage positioning of the front module housing adjacent the forward radiator fan of the work vehicle. As airflow is actively drawn into the radiator section of the work vehicle by action of the radiator fan to convectively cool the work vehicle radiator or heat exchanger, a fraction of the forced airflow is initially drawn through the front module housing to further increase the overall thermal performance characteristics or heat rejection capabilities of the front perception module. In the aggregate, such features may enable the front perception module to provide robust heat dissipation capabilities, while lacking any fans, liquid coolant circulation features, or other active cooling devices for increased durability, part count reduction, and overall cost savings of the front perception module.

In embodiments, the front perception module may contain a VPU assembly or perception controller, which is in signal communication with a number of stereo camera pairs within the front module housing and which has a cooling fin array. In such embodiments, the VPU assembly may be mounted in an inverted (fins down) orientation within the front module housing to, for example, position the cooling fin array into at least one cooling flow path extending through the front module housing, while minimizing debris build-up over the exterior surfaces of the cooling fins. Further, in at least some instances, the VPU assembly may be tilted or angled relative to a horizontal plane (e.g., such that the cooling fin array faces downwardly and rearwardly toward the work vehicle); and/or may be positioned adjacent and face a ramped flow guidance surface within module housing. Such a structural configuration may advantageously direct airflow across the cooling fin array, while reducing the velocity of airflow to increase the duration of contact between the airflow and the cooling fin array in a manner further boosting the heat rejection capabilities of the front perception module, as further discussed below in connection with FIGS. 15 and 16.

Discussing next the rear perception module in greater detail, when present within the work vehicle perception system, this module may be joined to (e.g., integrated into) or otherwise positioned adjacent a trailing edge portion of the work vehicle cabin roof. Several benefits may be achieved by mounting the rear perception module to or adjacent (e.g., immediately beneath) the trailing edge portion of the work vehicle cabin. Such benefits may include nominal obstruction of operator sightlines through the cabin windows, damage protection due to the elevated nature of this mounting location, access to clean (debris-free) air for cooling purposes (described below), spatial offset from the work vehicle hitch (if present), and sufficient EDP device elevation to provide sensor sightlines over and around various implements or machines that may be towed by the host work vehicle, such as a tractor, at different junctures in time. Further, in at least some implementations, the rear module housing of the rear perception module is dimensioned to span the width of the trailing portion of the work vehicle cabin roof to provide lateral mounting locations for at least two stereoscopic camera assemblies (or other EDP devices) in addition to a central rear mounting location for a central stereoscopic camera assembly (or analogous EDP device). Collectively, such a mounting arrangement may provide the stereoscopic camera assemblies (or other EDP devices) of the rear perception module with a relatively expansive or broad, rear-centered FOV, again approaching or exceeding 180° in embodiments. Therefore, when combined with the front perception module, a cumulative FOV of essentially 360° can be achieved to provide comprehensive sensor coverage of the environment surrounding a given work vehicle.

As do embodiments of the front perception module, embodiments of the rear perception module may also include strategically-positioned vents and similar airflow enhancement features promoting airflow through the rear perception module along one or more cooling airflow paths. By directing airflow through the rear module housing, and by designing the internal layout or architecture of the rear perception module to position heat-generating components in or adjacent the cooling airflow paths, an efficient cooling scheme is provided for dissipating excess heat generated by the heat-generating component(s) contained in rear module housing. Such heat-generating components may include, for example, a VPU or visual processing circuitry contained in the rear module housing and electrically coupled to the EDP devices in the form of a plurality of stereoscopic camera assemblies. The vents of the rear perception module may include one or more ram airflow vents promoting the intake of cooling airflow into the interior of the rear module housing during forward travel of the work vehicle. Further, in at least some embodiments, the rear perception module may include a lower trailing portion, which protrudes beyond the rear work vehicle window in an aft or reward direction and which is vented to promote air intake into the rear perception module rising in a generally upward direction alongside a rear window of the work vehicle cabin. Additionally or alternatively, venting may be provided along a topside or upper panel of the front perception module and along a bottomside of the rear perception module to promote outflow of cooling airflow in a generally vertical direction through a portion of rear perception module (e.g., a central housing section) containing a VPU assembly and/or other electronics prone to excess heat generation. Thus, once again, highly efficient heat dissipation schemes are provided to convectively cool heat-generating components contained within the rear perception module for enhanced thermal performance, including in the absence of fans or other active cooling mechanisms. The performance of the housed EDP sensor (e.g., stereoscopic camera) systems may be optimized as a result, while the overcall complexity, cost, and part count of the rear perception module is minimized.

Examples of front and rear perception modules contained in a work vehicle perception system will now be described in conjunction with a particular type of work vehicle (a tractor), as illustrated and discussed below in connection with FIGS. 1 and 2. Additional description of the example front module assembly is further set-forth below in connection with FIGS. 3-6, while further discussion of the example rear module assembly is provided below in connection with FIGS. 7-10. Finally, a second example embodiment of a front perception module included in a work vehicle perception system deployed onboard a tractor is set-forth below in connection with FIGS. 11 and 12. While described below in connection with a particular tractor, embodiments of the front perception module and/or the rear perception module can be utilized in conjunction with various different types of work vehicles (including other tractor platforms), whether such work vehicles are principally employed in the agricultural, construction, forestry, or mining industries, or another industrial context. Further, while the front perception module and the rear perception module are beneficially utilized in combination to, for example, provide a complete 360° cumulative FOV for EDP devices (e.g., stereoscopic camera assemblies) housed within the perception modules, the front perception module and the rear perception module can be deployed individually (in isolation) in at least some embodiments of the present disclosure. The following description is provided by way of non-limiting illustration only and should not be construed to unduly restrict the scope of the appended Claims in any manner.

Example Work Vehicle Perception System Including Front and Rear Perception Modules Referring initially to FIG. 1, a work vehicle 20 is equipped with a work vehicle perception system 22, as depicted in accordance with an example embodiment of the present disclosure. In the illustrated example, the work vehicle 20 assumes the form of an agricultural tractor. Accordingly, the work vehicle 20 and the work vehicle perception system 22 are specifically referred to below as a "tractor 20" and a "tractor perception system 22," respectively. The present example notwithstanding, embodiments of the work vehicle perception system 22 can be deployed onboard other types of work vehicles in alternative implementations, particularly other work vehicles equipped with front ballast systems similar or substantially identical to the below-described front ballast system 26 and utilized with removal ballast weights.

In addition to the tractor perception system 22, the example tractor 20 includes a mainframe or chassis 24, a front ballast system 26 rigidly joined to a forward end of the tractor chassis 24, and a number of ground-engaging wheels 28 supporting the tractor chassis 24. A cabin 30 is located atop the tractor chassis 24 and encloses an operator station in which an operator may reside when manually piloting the tractor 20. An engine compartment, which is partially enclosed by a tractor hood 32, is situated forward of the tractor cabin 30; and a rear hitch 34, associated with any number of hydraulic, pneumatic, or electrical couplings, is situated aft or rearward of the tractor cabin 30. In this particular example, the tractor chassis 24 has an articulable chassis design and such a forward chassis section 36 is able to pivot or swivel relative to a rear chassis section 38 about a vertical hinge line, which generally extends orthogonal to the plane of the page in FIG. 1. Located at a frontmost point of the tractor 20, the front ballast system 26 enables a number of modular weights (herein, "removable ballast weights") to be loaded onto and removed from a support structure joined to the tractor chassis 24. By adding or removing ballast weights in this manner, an operator can vary the cumulative mass acting on the front of the tractor 20 in selected increments when, for example, the tractor 20 is utilized to tow any one or more implements and traction at the ground-engaging wheels 28 (or tracks) is desirably boosted. Further description of the front ballast system 26 is provided below in connection with FIG. 2.

The example tractor 20 may be operable in a semi-autonomous mode, a fully autonomous mode, or both in embodiments. When capable of fully autonomous operation, the tractor 20 may nonetheless be produced to include a tractor cabin, such as the illustrated cabin 30, enclosing a manual operator station (including a seat, one or more displays, and various pilot controls) to allow manual operation of the tractor 20 when so desired. In addition to components supporting manual tractor operation, the example tractor 20 further includes various other components, devices, and subsystems commonly deployed onboard tractors and other work vehicles. Such components can include, for example, a radiator fan 40 positioned in a forward portion of the engine compartment adjacent a front grille 42 of the tractor 20 (labeled in FIG. 2). When active, the radiator fan 40 draws airflow through the front grille 42 and across a non-illustrated radiator or heat exchanger, which is housed within the engine compartment of the tractor 20. Liquid coolant is exchanged between the radiator and an internal combustion engine, such as a heavy duty diesel engine, further housed within the tractor engine compartment. Some fraction of the excess heat generated during engine operation is thus transferred to the surrounding ambient environment via convective transfer to the airflow impinging the fins or other exterior surfaces of the radiator by action of the radiator fan 40 in the well-known manner.

With continued reference to FIG. 1, the tractor perception system 22, includes a front perception module 44, a rear perception module 46, and a number of complementary onboard subsystems or devices 48 for collecting data from or otherwise exchanging data with the modules 44, 46; processing such data; and performing associated actions when, for example, the tractor 20 is engaged in autonomous operation, is remotely piloted by a human operator, or is manually piloted by a human operator located within the cabin 30. In the illustrated example, the front perception module 44 includes a front module housing 50 containing a number of perception sensors or EDP devices 52, one or more heat-generating components 54, and any number and type of additional electrical components 56. As indicated above, the EDP devices 52 can be any devices or sensors suitable for collecting depth information pertaining to the external environment of the tractor 20 for navigational, obstacle detection, environment mapping, or other purposes. Examples of sensor types suitable for usage as the EDP devices 52 include radar, lidar, and sonar-based sensors, which emit energy pulses and measure pulse reflections utilizing transducer arrays to estimate the proximity of various objects and surfaces located within the surrounding environment of the tractor 20. While the EDP devices 52 can assume various different forms (and combinations of different sensor types), embodiments of the front perception module 44 may be particularly well-suited usage in conjunction with stereoscopic camera assemblies for reasons discussed below. Accordingly, and by way of non-limiting example only, the front perception module 44 is principally described as containing stereoscopic camera assemblies or "stereo camera pairs," as is the rear perception module 46. Collectively, the EDP devices 52, and the heat-generating components 54, and any additional electronics housed within the front perception module 44 form an EDP sensor system 52, 54, 56.

When present, the heat-generating component or components 54 contained within the front perception module 44 may assume the form of processing components, such as printed circuit boards (PCBs) or cards populated by integrated circuit (IC) dies and other circuit elements, such as discrete capacitors, resistors, or inductors realized as Surface Mount Devices (SMDs). For example, when the EDP devices 52 assume the form of one or more stereoscopic camera assemblies, the heat-generating components 54 can include or may consist of a visual process circuitry electrically coupled to the stereoscopic camera assemblies for performing certain image processing tasks, such as pixel correlation of the twin video feeds supplied by the cameras in each stereoscopic camera assembly to assess image depth measurements utilizing the video feeds captured by the stereo cameras. In embodiments, such visual processing circuitry may be realized in the form of a VPU or VPU-containing assembly, such as the example VPU assembly discussed below in connection with FIGS. 15 and 16. As appearing herein, the term "VPU" is defined in a broad or comprehensive sense to generally encompass processing units or electronic modules adapted to provide video feed processing tasks. The term "VPU" encompasses the term "graphic processing unit" or "GPU," as defined herein. VPUs, and similar visual processing components commonly engaged in dynamic, high load processing tasks and potentially containing dense logic gate arrays and neural networks, are commonly prone to excess heat generation; and, thus, may benefit from efficient thermal dissipation reducing or eliminating excessive heat accumulation or "hot spots" within such logic or processing structures. For at least this reason, the front perception module 44 is advantageously produced to include heat dissipation features promoting efficient heat removal or extraction from such heat-generating components 54 by, for example, facilitating passive heat transfer to cooling airflow streams conducted along volumetrically robust, low resistance flow paths provided through the front module housing 50. Additional description in this regard is provided below in connection with FIGS. 2-6 and FIGS. 13-16.

Embodiments of the front perception module 44 may include any number and type of additional electronic components 56, which are contained within the front module housing 50 which may or may not be electrically coupled to the EDP devices 52 and the heat-generating component or components 54. Such additional electronic components 56 can include various processing components and other sensor types. Examples of such additional sensors that may be further contained in the front perception module 44 include microelectromechanical systems (MEMS) accelerometers, MEMS gyroscopes, and other inertial measurement sensors, as well as sensors for monitoring the health of the front EDP sensor system 52, 54, 56. It is also possible to pair or combine multiple types of EDP devices 52, such as one or more lidar sensors utilized in conjunction with stereoscopic camera assemblies, in at least some embodiments of the front perception module 44. Additionally or alternatively, such auxiliary or additional electronic components 56 can include lighting devices, which emit light in visible or non-visible portions of the electromagnetic (EM) spectrum to enhance operation of the EDP devices 52 in low light or other poor visibility conditions.

Regardless of the particular type of EDP devices housed within the front module housing 50, the EDP devices 52 are beneficially positioned such that the respective FOVs of the EDP devices 52 are angularly spaced or distributed about the forward and lateral sides of the module housing 50. For example, as indicated in FIG. 1, three EDP devices 52-1, 52-2, 52-3 may be contained within the front perception module 44 having individual FOVs 58, 60, 62, respectively. In the illustrated embodiment, this includes a forward-looking stereoscopic camera assembly 52-1 having a forward-centered FOV 58 extending from the front perception module 44 in principally a forward direction; a first lateral-looking stereoscopic camera assembly 52-2 having an FOV 60 extending from the front perception module 44 in a first lateral direction and perhaps angled forward of the tractor 20 to some degree; and a second lateral-looking stereoscopic camera assembly 52-3 having an FOV 60 extending from the front perception module 44 in a second lateral direction opposite the first lateral direction. Collectively, the FOVs 58, 60, 62 cooperate to provide a cumulative forward-centered FOV approaching, if not exceeding 180° to provide relatively full or comprehensive coverage of the environmental regions to the forward, forward-right (from an operator's perspective), and forward-left (from an operator's perspective) regions of the tractor 20. In other embodiments, the front perception module 44 can include a greater or lesser number of the perception sensors or EDP devices depending upon, for example, the desired cumulative angular coverage range of the sensors, the individual FOV angle of each of the perception sensors, packaging constraints, and other such factors.

As does the front perception module 44, the rear perception module 46 of the work vehicle perception system 22 includes a rear module housing 64 containing one or more perception sensors or EDP devices 66, at least one heat-generating component 68, and any number and type of additional electronic components 70. Collectively, the EDP devices 66, the heat-generating components 68, and the additional electronics 70 (if included) form a rear EDP sensor system 66, 68, 70. The heat-generating component 68 will often assume the visual processing circuitry or devices, such as a VPU when the rear EDP devices 66 assume the form of stereoscopic camera assemblies; however, the possibility that such visual processing circuitry (when present) may be externally located relative to the rear module housing 64 is not precluded. The additional electronics 70 can include various sensors in addition to the EDP devices 66; lighting devices operable in the visible or non-visible portions of the EM spectrum for enhancing operation of the EDP devices 66 when appropriate; MEMS gyroscopes, accelerometers, magnetometers, and similar devices potentially packaged as an Inertial Measurement Unit (IMU); beacon lights; and wireless (e.g., radio frequency) receivers, to list but a few examples. It is also possible to pair or combine a first type of EDP device (e.g., stereoscopic camera assemblies) with a second type of EDP device (e.g., lidar sensors) in at least some embodiments of the rear perception module 46, as previously noted.

The perception sensors or EDP devices 66 contained within the rear module housing 64 can assume various forms suitable for monitoring the spatial environment to the rear and lateral-rear of the tractor 20, examples of which have been previously mentioned. In the illustrated example, three EDP devices 66-1, 66-2, 66-3 are contained within the rear perception module 46 and possess individual sensor FOVs 72, 74, 76, respectively. Specifically, in the illustrated embodiment and by way of non-limiting example, the EDP devices 66-1, 66-2, 66-3 include a rear-looking stereoscopic camera assembly 66-1 having an FOV 72 extending from the rear perception module 46 in principally a rearward direction; a first rear-lateral-looking stereoscopic camera assembly 66-2 having an FOV 74 extending from the rear perception module 46 in the rearward direction and a first lateral direction; and a second rear-lateral-looking stereoscopic camera assembly 66-3 having an FOV 76 extending from the rear perception module 46 in the rearward direction and a second lateral direction opposite the first lateral direction.

The respective FOVs 72, 74, 76 of the stereoscopic camera assemblies 66-1, 66-2, 66-3 collectively form a combined or cumulative FOV approaching, if not exceeding 180°. Such a cumulative sensor FOV provides broad coverage of the environmental regions to the rear, rear-right (from the perspective of an operator seated within the cabin 30), and rear-left (from the operator's perspective) regions of the tractor 20. Further, in combination, the stereoscopic camera assemblies 52-1, 52-2, 52-3 contained in the front perception module 44 and the stereoscopic camera assemblies 66-1, 66-2, 66-3 contained in the rear perception module 46 provide the tractor perception system 22 with a complete or full 360° view of the external environment surrounding the tractor 20, thereby ensuring adequate sensor coverage to support autonomous or semiautonomous operation of the tractor 20 in at least some instances. As discussed more fully below in connection with FIGS. 7-10, the rear perception module 46 may be positioned adjacent (e.g., located immediately beneath) or, perhaps, directly joined to (e.g., integrated into) an upper aft or trailing edge portion of the cabin roof enclosing the tractor cabin 30. Such an elevated positioning of the rear perception module 46 enables the stereoscopic camera assemblies 66-1, 66-2, 66-3 to better "see" over and around any implements, such as balers, seeders, commodity carts, grain carts or wagons, tillage implements, mower-conditioners, and so on, connected to the rear hitch 34 and towed by the tractor 20 at a given juncture in time. Additional benefits are also realized by integration or joinder of the rear perception module 46 into the rear roofline of the tractor cabin 30, as further discussed below in connection the subsequent drawing figures.

Any number of additional subsystems or devices 48 may be deployed onboard the tractor 20, included in the work vehicle perception system 22, and utilized in conjunction with the front and rear perception modules 44, 46. This may include various central processing components 78; e.g., any practical number of processors, control computers, computer-readable memories, power supplies, storage devices, interface cards, and other standardized components, which receive data from the EDP sensor systems within the perception modules 44, 46 and perform any number of processing tasks. The central processing components 78 may also include or cooperate with any number of firmware and software programs or computer-readable instructions designed to carry-out the various process tasks, calculations, and control/display functions described herein. In many instances, the additional subsystems or devices 48 may include a telematics module 80 or wireless datalink (e.g., a modular telematics gateway) allowing remote piloting of the tractor 20 and/or data exchange with a backend service, such as a cloud-based server end, over a communications network to perform certain processing tasks and functions associated with autonomous operation of the tractor 20.

Various other components 82 can also be included in the tractor perception system 22 or otherwise deployed onboard the example tractor 20, such as operator controls and visual interfaces (e.g., display devices), enabling human operators to view information and provide command inputs when present within the cabin 30 of the tractor 20. For example, in instances in which the tractor 20 is piloted by a human operator within the tractor cabin 30, the central processing subsystem 78 may receive obstacle detection data from the sensors within the perception modules 44, 46 and generate various audible, visual, and/or haptic alerts advising the tractor operator of nearby obstacles posing collision risks or otherwise desirably brought to the attention of the operator. Various other guidance functionalities can also be carried-out by the central processing subsystem 78 utilizing data provided by the perception modules 44, 46, such as crop row following functions and lane keeping functions (during public road transport). Generally, then, the tractor perception system 22 can include any number of components, devices, and subsystems suitable for receiving data inputs from the perception modules 44, 46; processing such data inputs; and performing various actions based, at least in part, on consumption of such data inputs, such as automation functions, display/alerting functionalities, and reporting data over the telematics module 80 with a network-connected server end, to list but a few examples.

Figure 2:
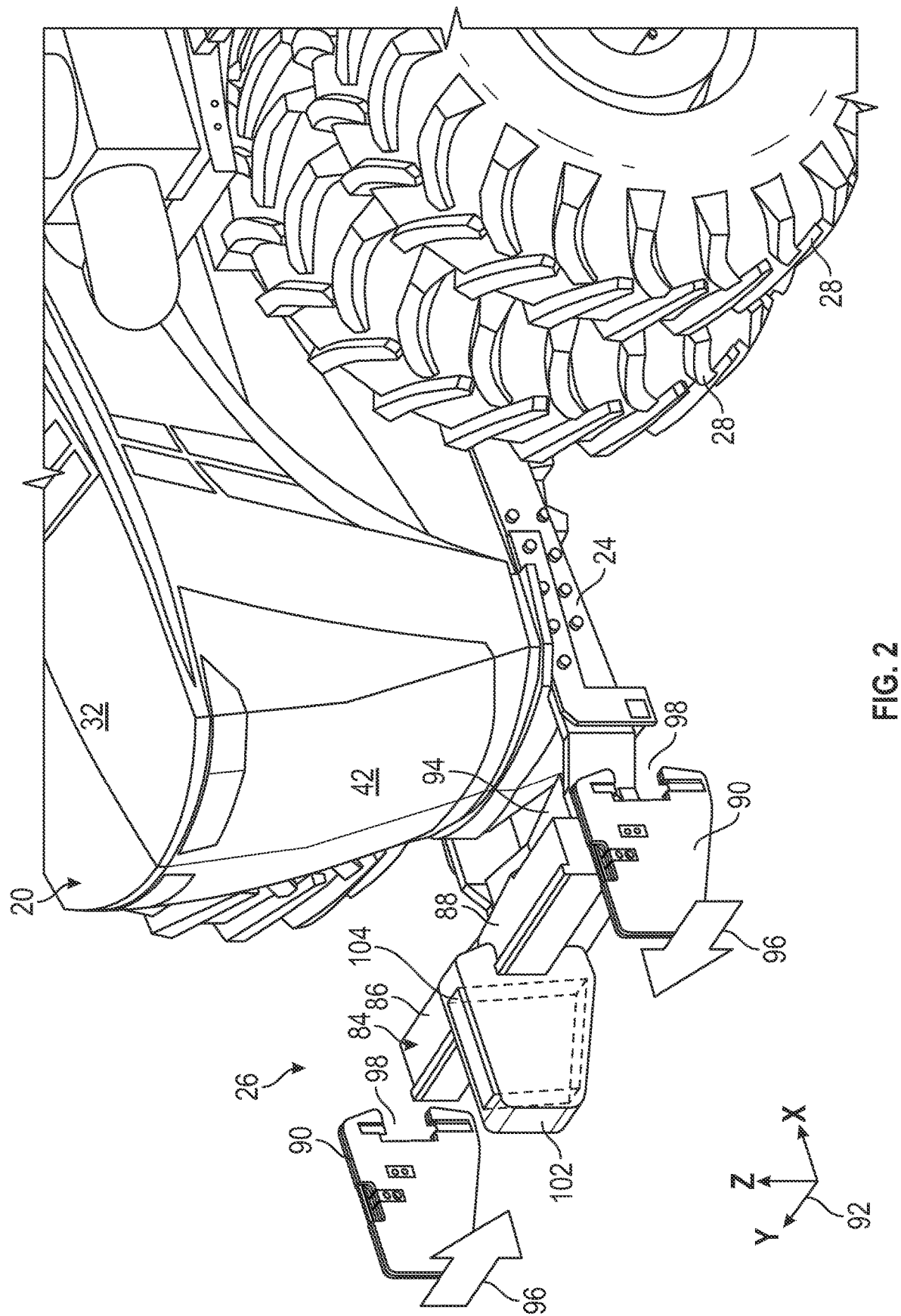
FIG. 2 is an isometric view of a front end portion of the tractor shown in FIG. 1 further illustrating a front ballast system having a laterally-extending hanger bracket, which is shaped and sized to support a number of removable ballast weights and to which the front perception module (hidden from view) is rigidly joined.

Turning to FIG. 2, a forward end of the tractor 20 and the front ballast system 26 are shown in greater detail. In this view, the front perception module 44 is largely or wholly hidden from view to more clearly reveal the front ballast system 26, which can assume any form suitable for supporting a number of removable ballast weights during tractor operation. In the illustrated example, the front ballast system 26 includes a laterally-extending hanger rack or bracket 84 having opposing outer ends serving as weight support sections 86, 88. The laterally-extending hanger bracket 84 is joined to the tractor chassis 24 by a connecting yoke 94, which is, in turn, rigidly joined to the tractor chassis 24. In other embodiments, the laterally-extending hanger bracket 84 can be joined to the tractor chassis 24 in another manner. The laterally-extending hanger bracket 84 possesses a beam-like shape or geometry along its length and includes certain physical retention features, such laterally-extending ridges or keys, for retaining removable ballast weights 90 on the weight support sections 86, 88 in multiple degrees of freedom (DOFs). As indicated in FIG. 2 by arrows 96, an operator may manually insert or load a desired number of the removable ballast weights 90 onto the weight support sections 86, 88 of the hanger bracket 84 along insertion axes (parallel to the Y-axis of coordinate legend 92) to bring the front ballast system 26 to a desired cumulative weight. The removable ballast weights 90 can assume various forms suitable for engagement with and retention on the laterally-extending hanger bracket 84. In the illustrated example, the removable ballast weights 90 each have a generally rounded rectangular formfactor, as viewed from the side, and an upper handle easily grasped by an operator. When having such a formfactor, the removable ballast weights 90 are commonly referred to as "suitcase weights." Additionally, the ballast weights 90 include slotted endwall portions 98, which feature slots or keyways in which the laterally-extending ridges or keys of the weight support sections 86, 88 are received when the removable ballast weights 90 are loaded onto the weight support sections 86, 88.

The physical interaction or interference between the ridge or key of the laterally-extending hanger bracket 84 and the keyways of the slotted sidewall portions 98 prevents inadvertent disengagement of the removable ballast weights 90 in vertical and longitudinal directions (along the X- and Z-axes of the coordinate legend 92) during tractor operation. Once loaded onto the laterally-extending hanger bracket 84, the removable ballast weights 90 may be retained in their desired positions by friction; or, instead, the ballast weights 90 may be secured to the laterally-extending hanger rack or bracket 84 utilizing quick pins, collars, one or more elongated bolts extending laterally through openings in the ballast weights 90, or similar devices preventing the removable ballast weights 90 from inadvertently disengaging from the laterally-extending hanger bracket 84 along the Y-axis of the coordinate legend 92 until operator removal. Finally, as shown in FIG. 2, and discussed further below, a central structure (herein, a "central support structure 102") may further be provided in embodiments and joined to an intermediate portion of the laterally-extending hanger bracket 84; e.g., the central support structure 102 may be integrally formed with the hanger bracket 84 as a single cast piece, separately fabricated and permanently joined (e.g., welded) to the hanger bracket 84, or separately fabricated and joined to the hanger bracket 84 utilizing bolts or other fasteners. When present, the central support structure 102 contributes additional mass to the front ballast system 26, serves as a centrally-fixed partition to ensure that the ballast weights 90 are distributed across the laterally-extending hanger bracket 84 in a balanced manner, and may help support or attach the front module housing 50 of the front perception module 44, as further described below in connection with FIGS. 3 and 4.

Figure 3:
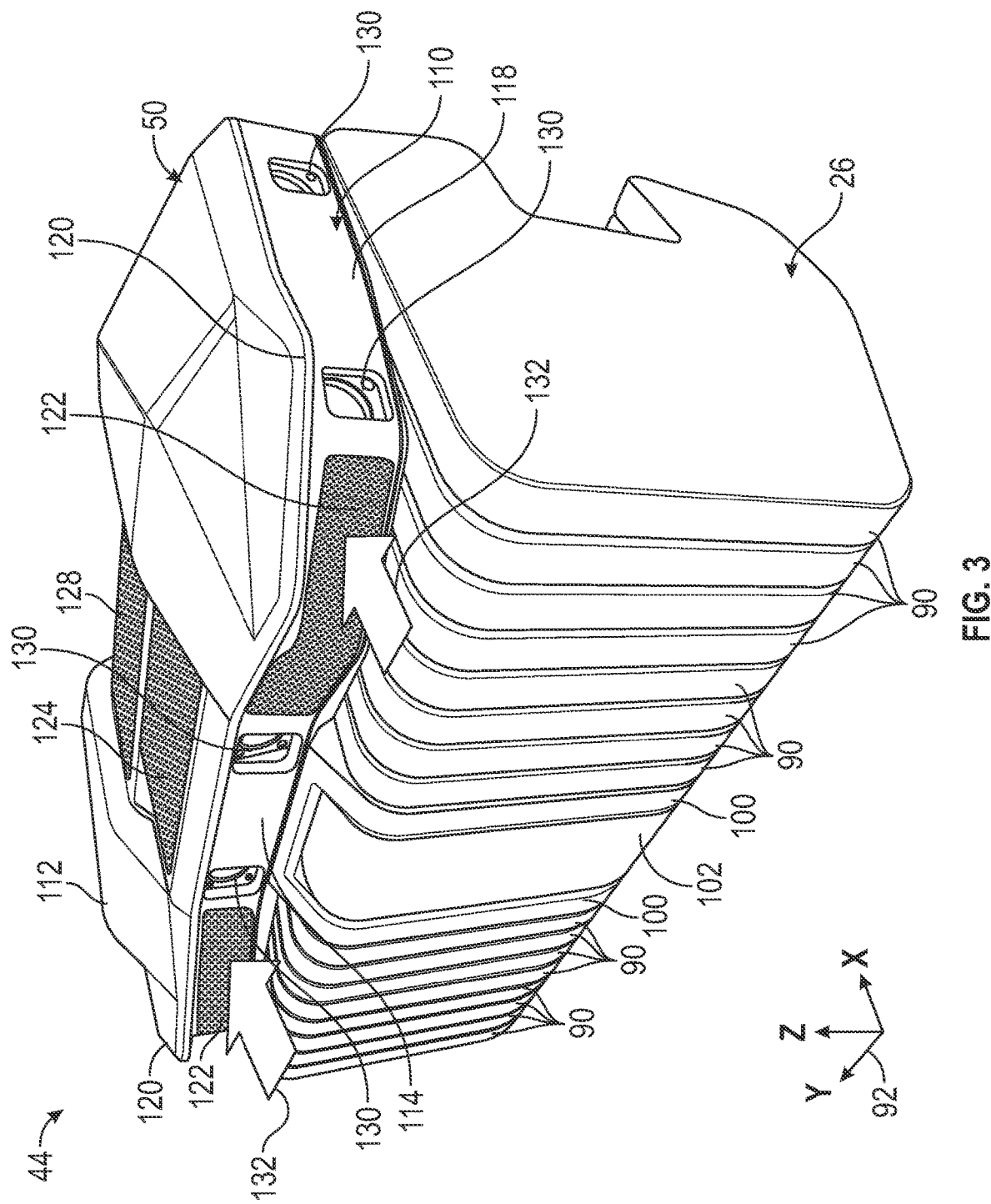
FIGS. 3 and 4 are side perspective and front views, respectively, of the example front perception module including a front module housing containing a number of environmental depth perception (EDP) devices, as well as a number of removable ballast weights loaded onto the hanger bracket of the front ballast system (hidden from view) and positioned beneath the front module housing.
Figure 4:
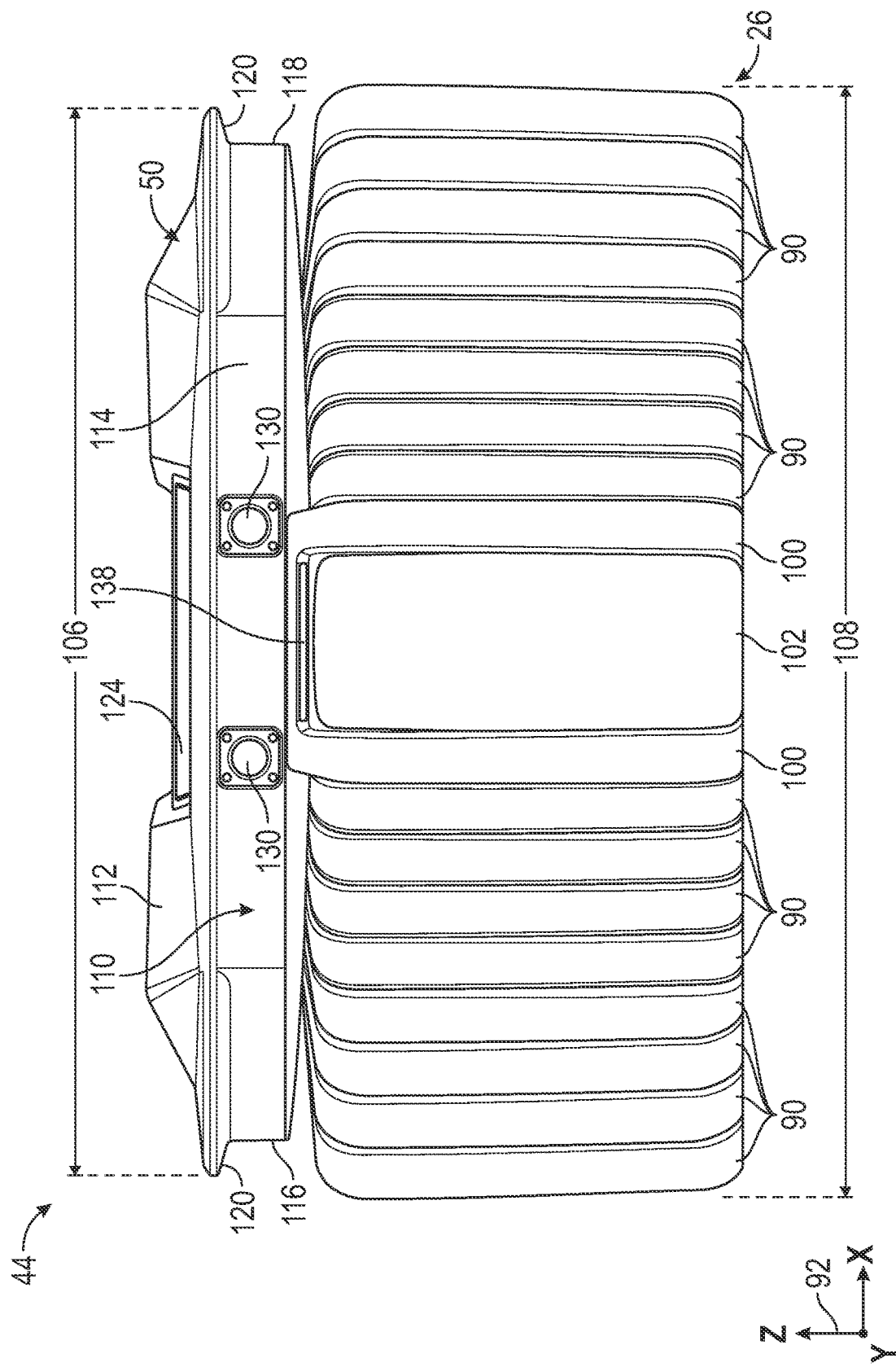

Referring now to FIGS. 3 and 4, the example front perception module 44 is shown in greater detail in addition to the central support structure 102 (which may or may not be included in the front perception module 44) and a plurality of removable ballast weights 90. The front ballast system 26 is considered "fully loaded" in these drawing figures as a maximum number of the removable ballast weights 90 is loaded onto the laterally-extending hanger bracket 84 (not shown for clarity). Specifically, in the illustrated example, eight removable ballast weights 90 are loaded onto each weight support section 86, 88 such that the laterally-extending hanger bracket 84 retains a total of sixteen ballast weights 90. In further embodiments, the laterally-extending hanger bracket 84 may be capable of retaining a greater or lesser number of the removable ballast weights 90 when fully loaded. As a common example, however, front ballast systems including laterally-extending hanger racks or bracket similar to the laterally-extending hanger bracket 84 are often capable of supporting between four and thirty removable ballast weights. The individual mass or weight of each of the removable ballast weights may also vary between embodiments and, in certain cases, the ballast weights may be provided in multiple discrete weight selections. This stated, the removable ballast weights 90 will often each have a standardized weight ranging between about 60 and 120 pounds and, perhaps, equal to about 95 pounds in embodiments.

The front module housing 50 is rigidly joined to the laterally-extending hanger bracket 84, whether by mechanical attachment, by integral formation with any portion of the front module housing 50 with the laterally-extending hanger bracket 84, by welding or another permanent joinder means, or in another manner. In the illustrated example, the front module housing 50 is joined to the laterally-extending hanger bracket 84 utilizing one or more mounting flanges 100, which extend from a lower portion of the front module housing 50 to attach a mid-section of the laterally-extending hanger bracket 84 at a location between the opposing weight support sections 86, 88 of the hanger bracket 84. As indicated above, the central support structure 102 is received or otherwise located between the mounting flanges 100 in the illustrated example such that mounting flanges 100 flank each side of the central support structure 102. The central support structure 102 may serve as a central weight for the front ballast system 26, as well as a physical support or platform for the front module housing 50. Additionally, as shown in phantom FIG. 2, a vertically-extending channel, duct, or conduit 104 (herein, a "thermal chimney 104") can be formed through the central support structure 102 in embodiments. When provided, the thermal chimney 104 enables airflow to travel or rise upwardly through the central support structure 102 and into the underside of the front module housing 50, which may include a corresponding lower vent feature or port. This promotes convective cooling of the heat-generating components 54 (e.g., VPU) contained within the front module housing 50 by allowing such vertical or "convective column" airflow, as further described below.

With continued reference to FIGS. 3-4, the central support structure 102 may be integrally formed with the mounting flanges 100 as a single part or unitary structure in embodiments. Alternatively, when present, the central support structure 102 may be separately formed from the mounting flanges 100 and joined to (e.g., bolted to, welded to, integrally formed with, or otherwise joined to) the laterally-extending hanger bracket 84 in certain implementations. In such implementations, the mounting flanges 100 may be positioned onto either side of the central support structure 102, pivoted into engagement with the laterally-extending hanger bracket 84, and then secured in place utilizing fasteners, welding, or another joinder technique. Various other constructions are also possible in alternative embodiments, providing that the front module housing 50 is rigidly joined to the tractor chassis 24 through the laterally-extending hanger bracket 84 in some manner. For example, in alternative realizations, the lower structure or "mounting base" of the front perception module 44 may insert into one or more corresponding openings provided in the central support structure 102 to secure and register the module 44 to the front ballast system 26.

The mounting flanges 100, and any other associated mount features utilized to secure the front module housing 50 to the laterally-extending hanger bracket 84 (e.g., the central support structure 102), is generally referred to herein as a "mounting base 100, 102." The mounting base 100, 102 may be configured to engage into the laterally-extending hanger bracket 84 to allow attachment of the front perception module 44 via, for example, a retrofit installation. In this case, the mounting base 100, 102 may include one or more mounting flanges (e.g., the mounting flanges 100) having generally C-shaped geometries, which define orifices or slots (shown most clearly in FIG. 6) opening toward the laterally-extending hanger bracket 84. The flange slots may be sized and shaped to enable mating installation of the mounting base 100, 102 on the laterally-extending hanger bracket 84; e.g., by fitting the mounting flanges 100 into engagement with the hanger bracket 84 and then securing the mounting flanges 100 in their desired position. In the illustrated example, specifically, the mounting base of the front perception module 44 includes two C-shaped mounting flanges 100, which are configured to matingly engage into the laterally-extending hanger bracket 84 and which are spaced along an axis extending substantially parallel to the axis along which the front module housing 50 is elongated (corresponding to the Y-axis of coordinate legend 92). In embodiments in which the central support structure 102 is separately fabricated from the mounting flanges 100, the C-shaped mounting flanges 100 may be spaced by a lateral offset equal to or slightly greater the lateral width of the central support structure 102 such that the central support structure 102 is received between the mounting flanges 100 in a close-fit relationship to center the front perception module 44 onto the laterally-extending hanger bracket 84 and to prevent lateral movement of the front perception module 44 once installed onto the front ballast system 26.

In the above-described manner, the front module housing 50 is rigidly coupled to the laterally-extending hanger bracket and, therefore, to the tractor chassis 24 through its mounting base, which includes the above-described mounting flanges 100 and may also include the central support structure 102 in at least some implementations. A structurally-robust attachment interface or mounting is thus provided to minimize the transmission of disturbance forces to the EDP sensor system 52, 54, 56 in the illustrated example embodiment. This, in turn, may reduce sensor errors experienced by the EDP devices 52 (e.g., the stereoscopic camera assemblies 52-1, 52-2, 52-3) as the tractor 20 travels over rough terrain or is otherwise subject to disturbance forces. Reduction of the magnitude (amplitude) of vibrational forces transmitted to the EDP device 52 when assuming the form of the stereoscopic camera assemblies 52-1, 52-2, 52-3, in particular, may ease processing demands by minimizing jitter transmitted to the cameras and the resulting frame-by-frame displacement of the captured imagery.

The front module housing 50 may have various different shapes and constructions in embodiments. In the illustrated example, specifically, the front module housing 50 includes a main housing body 110 having an interior compartment in which the EDP sensor system 52, 54, 56 is housed and which is enclosed by a cover piece 112. The main housing body 110 includes, in turn, a leading or forward-facing wall 114, a first sidewall 116, and a second sidewall 118 opposite the first sidewall 116. A protruding peripheral edge or rim 120 (identified in FIGS. 4 and 5) is further provided at the interface of the main housing body 110 and cover piece 112. When present, the peripheral rim 120 of the main housing body 110 may provide a physical standoff in which componentry is not housed to offer additional impact protection and some degree of light shielding protecting the EDP sensor system 52 contained within the front module housing 50. The front module housing 50 extends over (is cantilevered over or overhangs) opposing side portions of the laterally-extending hanger bracket 84 (the weight support sections 84, 86) in a manner enabling positioning of the removable ballast weights 90 beneath the front module housing 50.

The front module housing 50 has a low profile, pancake-like formfactor, which extends laterally from the mounting flanges 100 in both directions along the Y-axis of coordinate legend 92. Accordingly, the front module housing 50 is elongated in a lateral width direction corresponding to the Y-axis of coordinate legend 92. Concurrently, in the present example, the lateral width of the front module housing 50, as measured along the Y-axis of coordinate legend 92 (represented by double-headed arrow 106 in FIG. 4), is less than the corresponding Y-axis dimension (the lateral width) of the laterally-extending hanger bracket 84, as measured from the outer terminal end of the weight support section 86 to the outer terminal end of the opposing weight support section 88 (represented by double-headed arrow 108). Further, as best seen in FIG. 3, the leading edge portion or peripheral rim 120 of the front module housing 50 are recessed relative to the leading edge of the front ballast system 26 (including the removable ballast weights 90) to provide mechanical protection in the unlikely event of collision.

Several airflow ports or vents 122, 124, 126, 128 are formed in different walls or surfaces of the front module housing 50, with each vent 122, 124, 126, 128 potentially covered utilizing a perforated plate or mesh screen in embodiments. Soo too is a number of sensor line of sight (LOS) openings or apertures 130 formed in the front module housing 50 at appropriate locations to provide the desired sensor FOV extending forward and to the sides of the front perception module 44 and, more generally, the host tractor 20. In the illustrated embodiment, the sensor LOS apertures 130 are formed in the peripheral walls 114, 116, 118 of the front module housing 50 such that: (i) a first EDP sensor (the stereoscopic camera assembly 52-1, identified in FIG. 1) has an LOS extending through one or more apertures 130 provided in the leading wall 114 of the front module housing 50; (ii) a second EDP sensor (the second stereoscopic camera assembly 52-2, FIG. 1) has an LOS extending through one or more apertures 130 provided in the first sidewall 116 of the front module housing 50; and (iii) a third EDP sensor (the third stereoscopic camera assembly 52-3, FIG. 1) has an LOS extending through one or more apertures 130 provided in the second, opposing sidewall of the front module housing 50. Generally, then, the EDP sensor system 52, 54, 56 includes a plurality of EDP devices (here, the stereoscopic camera assemblies 52-1, 52-2, 53-3) distributed about a peripheral portion of the front module housing 50 to provide a cumulative forward-centered FOV having a relatively broad or wide angular range in a horizontal plane; e.g., a forward-centered FOV equal to or greater than 180 degrees seen looking downwardly onto the tractor 20, as described above in connection with FIG. 1.

Figure 5:
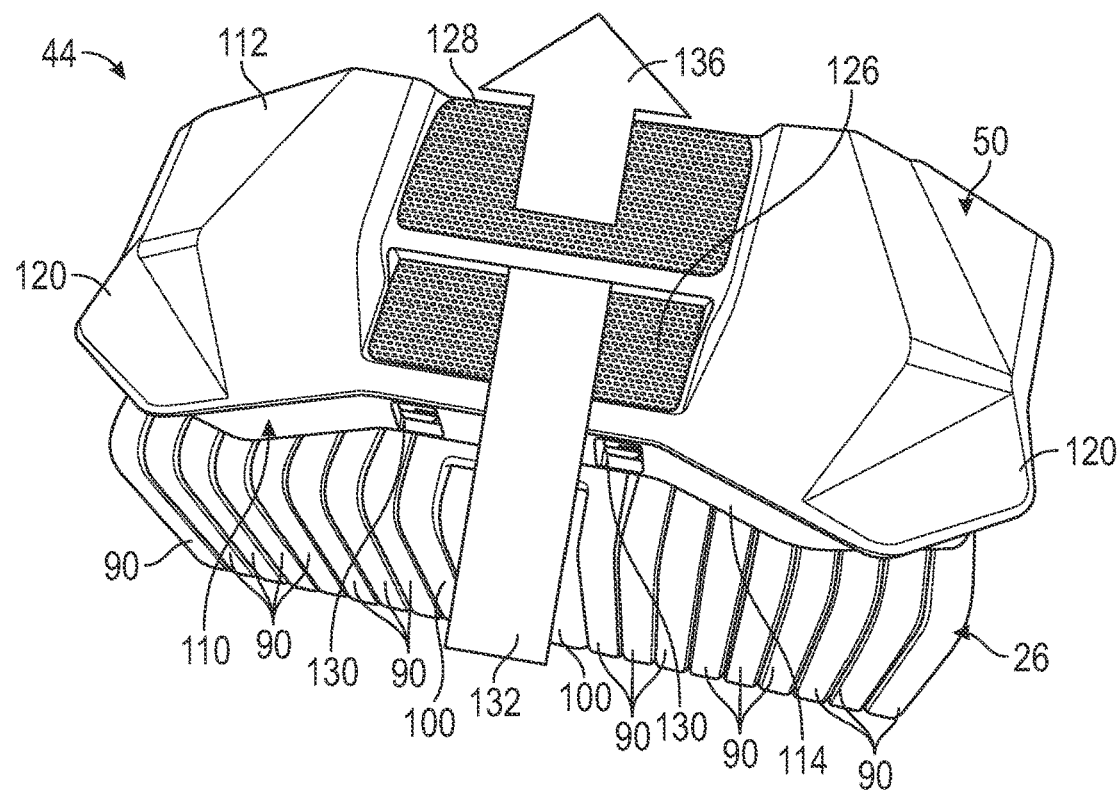
FIGS. 5 and 6 are perspective views of the example front perception module, which jointly illustrate one manner in which airflow may be directed through the front module housing along one or more of cooling airflow paths to dissipate heat generated by at least one heat-generating component, such as a visual processing unit (VPU), contained within the front perception module and electrically coupled to the EDP devices.
Figure 6:
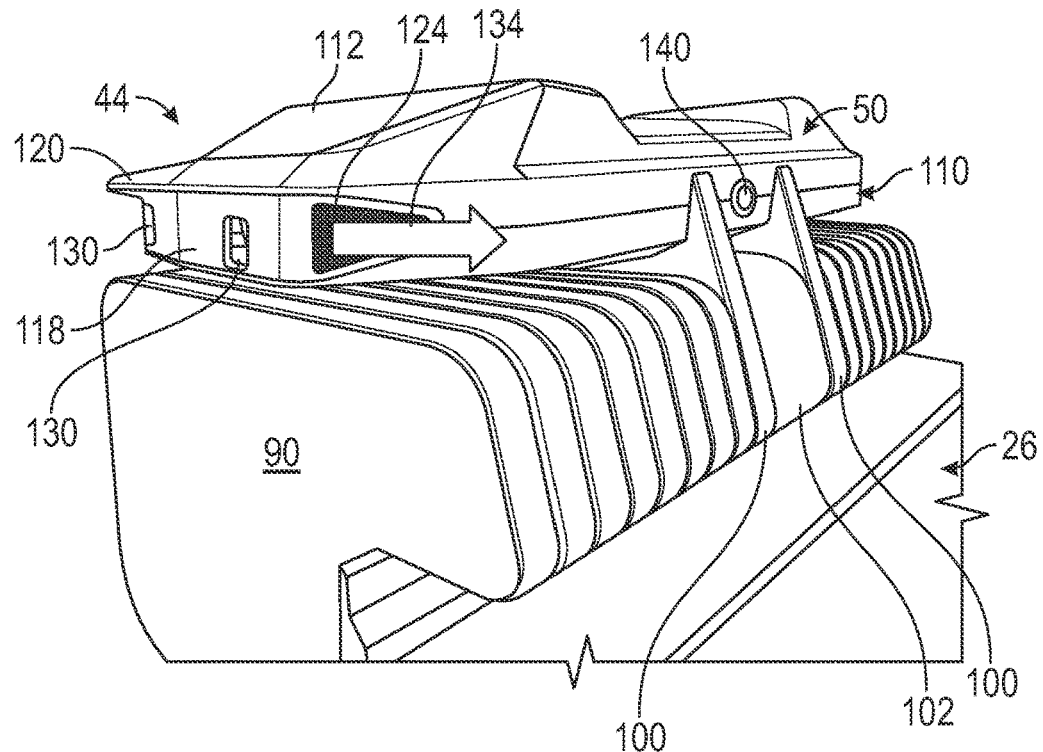
Figure 7:
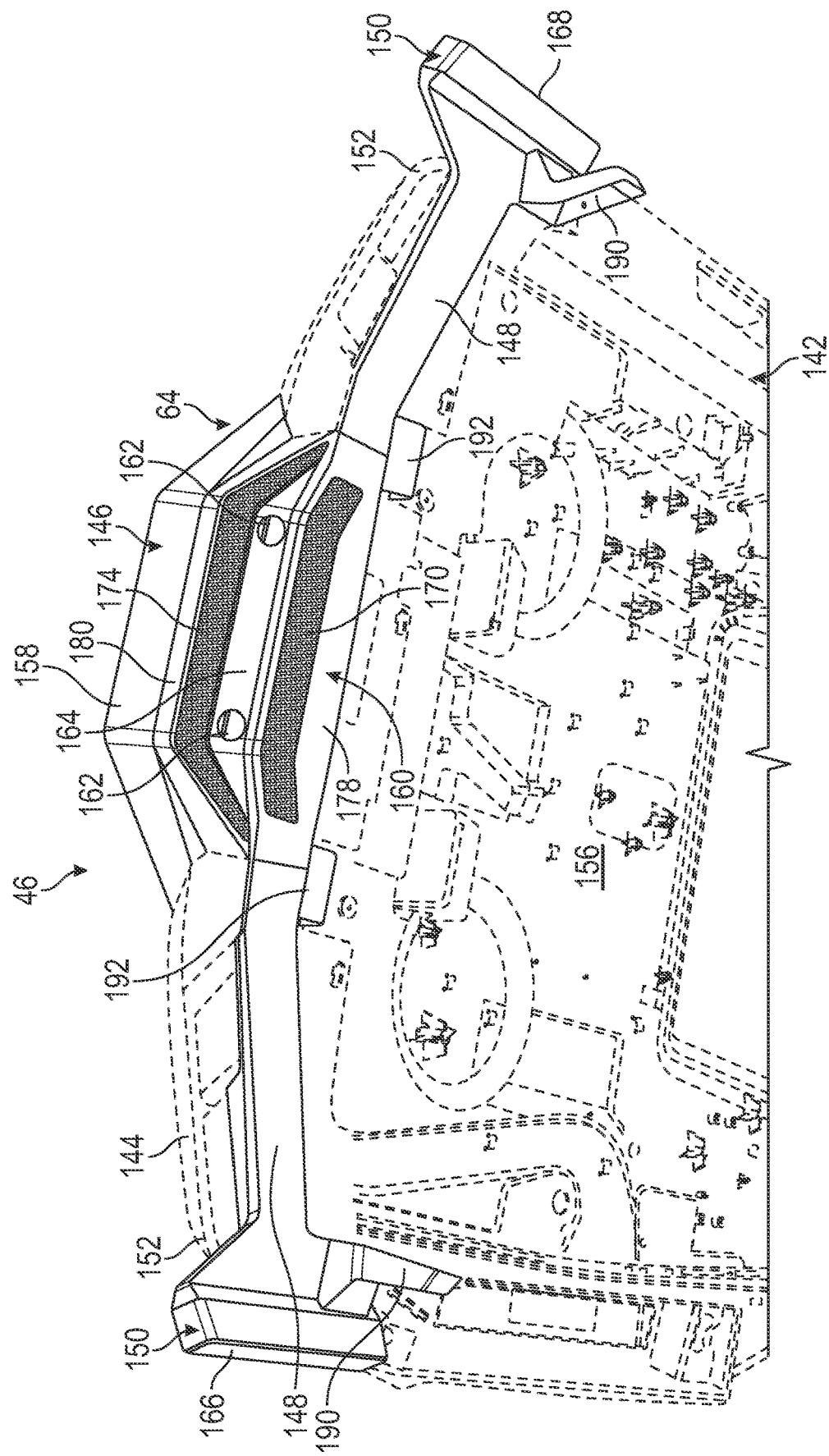
FIGS. 7, 8, and 9 are lower perspective, upper perspective, and side views, respectively, of the rear perception module mounted adjacent or to a trailing edge portion of the cabin roof of the tractor shown in FIG. 1, as illustrated in accordance with an example embodiment of the present disclosure.
Figure 8:
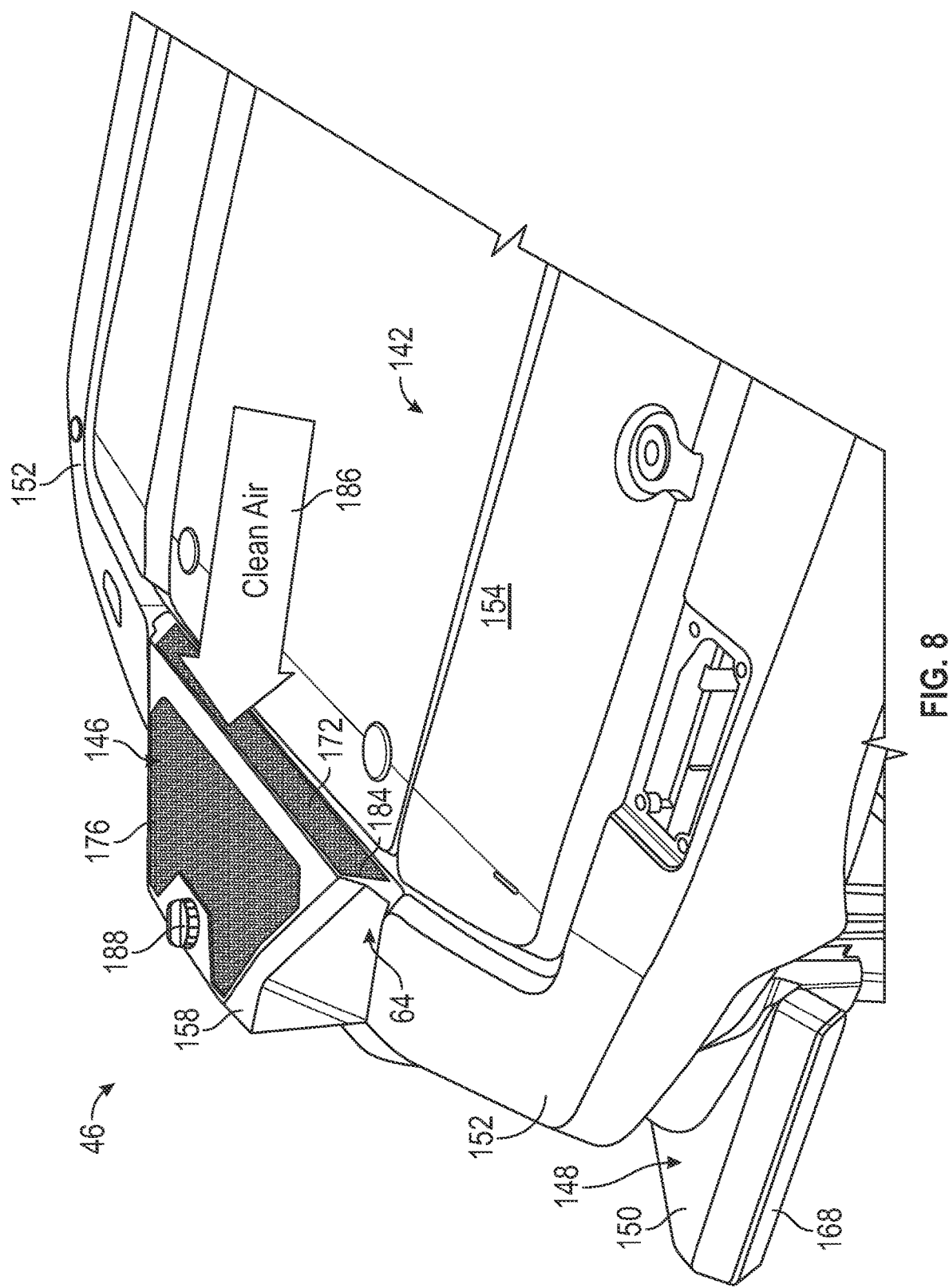
Figure 9:
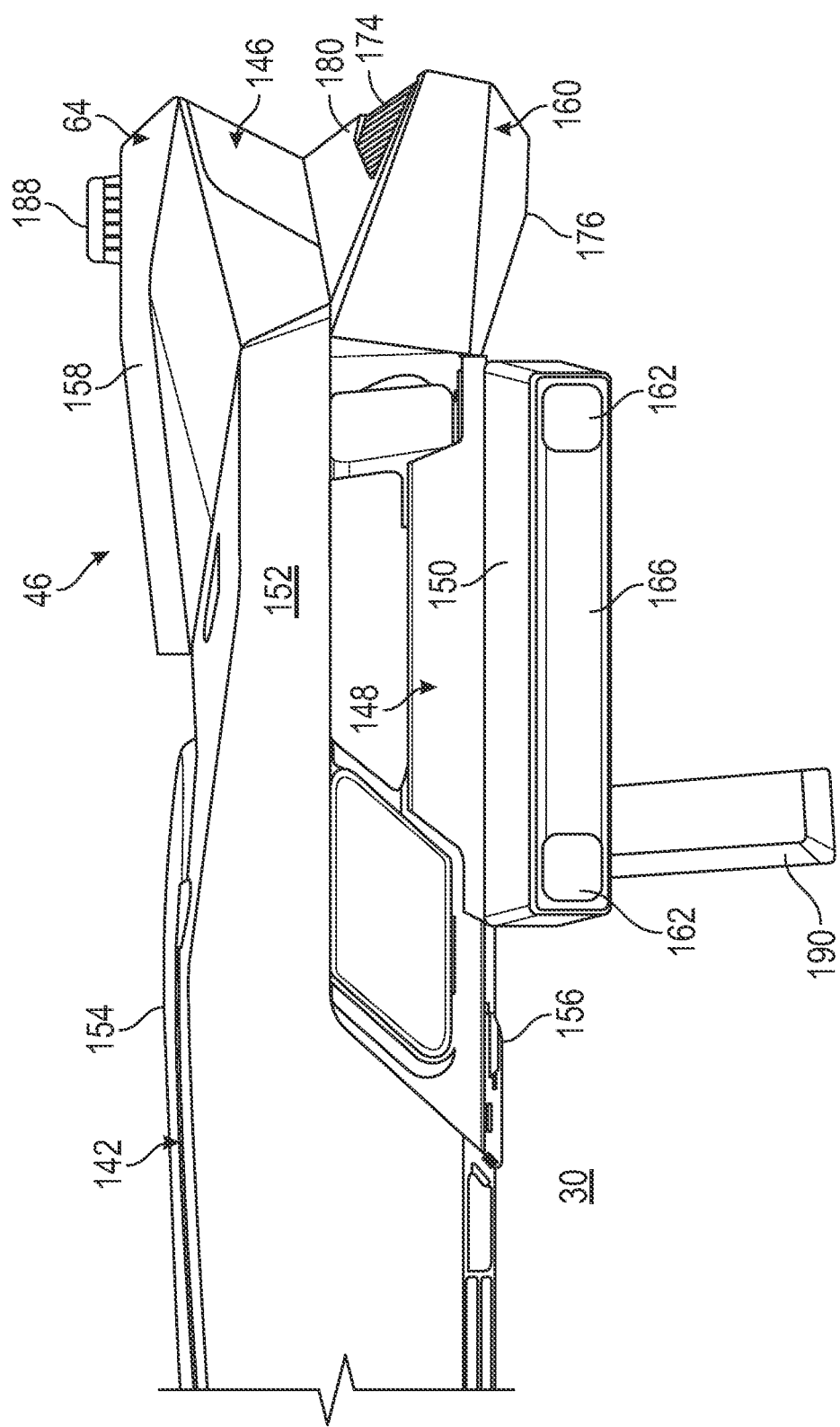

As previously stated, airflow vents 122, 124, 126, 128 are formed at locations through exterior walls or surfaces of the front module housing 50. Generally, the airflow vents 122, 126 serve as inlet vents, while the airflow vents 124, 128 serve as outlet vents of the front module housing 50. The inlet vents 122, 124 of the front module housing 50 are positioned to receive ram airflow into the interior of the front module housing 50 as the tractor 20 travels in a forward direction. Such airflow travels along cooling airflow paths extending through the front module housing 50 from the inlet vents 122, 124 to the outlet vents 126, 128, broadly considered. The cooling airflow paths extending from the inlet vents 122 to the outlet vents 124 are represented in FIGS. 3 and 6 by arrows 132, 134; while the cooling airflow path extending from the inlet vent 124 to the outlet vent 128 is represented in FIG. 5 by an arrow 136. In certain embodiments, at least one opening serving an additional "underside" inlet vent may be formed in a lower or bottom wall of the front module housing 50, as generically indicated in FIG. 4 by graphic 138. When provided, such an underside inlet vent (graphic 138) may be positioned to intake rising airflow into an interior compartment of the front module housing 50, with the thermal chimney 104 fluidly coupled to the inlet vent formed in the bottom wall of the front module housing 50. Airflow may therefore be conducted through the thermal chimney 104 and into the front module housing 50 via the bottomside inlet vent 138 as such airflow rises, absorbs excess heat from the heat-generating component(s), and pulls additional airflow in a generally upwardly through the thermal chimney 104 and into the interior of the front module housing 50.

In at least some embodiments of the front perception module 44, one or more of the heat-generating components 54 may be positioned in or adjacent the cooling airflow paths 132, 134, 136 such that excess heat generated by the heat-generating component(s) 54 is dissipated by convective transfer to airflow conducted along the cooling airflow path during operation of the front perception module 44. As noted above, the heat-generating component 54 may be visual processing circuitry, such as a VPU, electrically coupled to the EDP devices 52 when assuming the form of stereoscopic camera assemblies; with the VPU (or other heat-generating component 54) generally mounted in a central portion of the front module housing 50 to maximize exposure to the cooling airflow directed along the cooling airflow paths 132, 134, 136. Accordingly, in embodiments, the heat-generating component(s) 54 (e.g., a VPU or other visual processing circuitry) may be positioned rearward of the central stereoscopic camera assembly 52-1; between the left and right stereoscopic camera assemblies 52-2, 52-3; and above the thermal chimney 104 and the underside inlet vent 138 when provided. In other implementations, the heat-generating component(s) 54 of the EDP sensor system 52, 54, 56 may be located within a different region of the front module housing 50; or may be omitted from the EDP sensor system 52, 54, 56 altogether.

Due to the positioning of the above-described airflow vents 122, 124, 126, 128, 138, cooling airflow may be directed through the front module housing 50 when the tractor 20 travels in a forward direction and when the tractor 20 remains substantially stationary. Moreover, airflow through the front perception module 44 may be further promoted by positioning one or more outlets vents (here, the outlet vents 124, 128) adjacent the grille 42 of the tractor 20 such that airflow is drawn into the front module housing 50 when the radiator fan 40 is active. In this manner, the front perception module 44 leverages proximity to the radiator fan 40 to further boost convective of the heat-generating component(s) 54 within the front perception module 44. The thermal dissipation or heat rejection capabilities of the front perception module 44 are enhanced as a result, including in embodiments in which the front perception module 44 itself lacks any fans or other active cooling mechanisms. This, in turn, may help ensure optimal performance of the EDP sensor system 52, 54, 56, while minimizing the part count, reducing the complexity, and improving the overall reliability of the front perception module 44. This benefit notwithstanding, the front perception module 44 can contain fans or other active cooling devices in alternative implementations.

In the above-described manner, the front perception module 44 provides improved heat dissipation of components contained within the EDP sensor system 52, 54, 56 to prolong service life and promote optimal operation of vital electronic components, such as any visual processing components contained within the EDP sensor system 52, 54, 56. Additionally, mechanical protection is afforded to the EDP sensor system 52, 54, 56 by virtue of secure mounting to the hangar bracket 84 included in the front ballast system 26 and the recessing the leading (and possibly side) edges of the front module housing 50 relative to the leading (and side) edges of the front ballast system 26. During operation of the front perception module 44, the EDP sensor system 52, 54, 56 may communicate with the central processing subsystem 78 or other onboard subsystem 48 over any suitable wired or wireless connection. As shown in FIG. 6, a connector port 140 may be provided in the rear of the front module housing 50 for routing wire harness or connector cables provided the desired electrical connections within the electronic components contained in the front perception module 44. In other embodiments, a different wire routing scheme may be employed; and, in implementations in which the front perception module 44 or the front ballast system 26 include a thermal chimney 104 or similar vertically-extending channel, the wire bundles or cables may be routed through or adjacent the thermal chimney 104 and to a suitable interface point within the electronics onboard the tractor 20.

Turning next to FIGS. 7-10, an example embodiment rear perception module 46 is shown as installed along the rear of a cabin roof 142 enclosing the tractor cabin 30. As can be seen, the rear module housing 64 of the rear perception module 46 is joined to a trailing or rear edge portion 144 of the cabin roof 142; and, in embodiments, may define one or more surfaces of the rear portion 144 of the cabin roof 142. In the illustrated example, the rear module housing 64 includes a central housing body 146 and two wing sections 148. The wing sections 148 of the rear module housing 64 extend from the main housing body 146 in opposing directions and each terminate in an enlarged lateral end portion 150. Specifically, the wing sections 148 terminate adjacent opposing rear corner regions 152 of the cabin roof 142, with each enlarged lateral end portion 150 located below an upper surface or topside 154 of the cabin roof 142 and tilted in a slight downward direction. Further, as shown most clearly in FIG. 7, the wing sections 148 extend along an underside 156 of the cabin roof 142; and, perhaps, may fit into and extend within channels or larger open slots formed in the underside 156 of the cabin roof 142. Comparatively, the central housing body 146 includes an upper raised portion 158 that projects upwardly from the upper surface or topside 154 of the cabin roof 142. Additionally, the central housing body 146 of the rear module housing 46 includes a rear protruding section 160, which projects from the cabin roof 142 in a rearward direction.

Due to the geometry of the rear perception module 46, and specifically the manner in which the rear module housing 64 spans the width of the cabin roof 142, optimal position is provided for multiple EDP devices about the upper rear periphery of the tractor roof 142. In embodiments, the rear perception module 46 includes a first EDP device (e.g., the stereoscopic camera assembly 66-1 identified in FIG. 1) having an LOS extending through one or more apertures 162 provided in a rear-facing wall 164 of the central housing body 146; a second EDP device (e.g., the stereoscopic camera assembly 66-2) having an LOS extending through one or more apertures 162 provided in an outer terminal (lateral-facing) wall 166 of a first wing section 148; and a third EDP device (e.g., the stereoscopic camera assembly 66-3) having an LOS extending through one or more apertures 162 provided in an outer terminal wall 168 of the other of the wing sections 148. Collectively, the EDP devices (e.g., the stereoscopic camera assemblies 66-1, 66-2, 66-3) are positioned to provide a cumulative rear-centered FOV equal to or greater than 180 degrees)(°, as seen looking downwardly onto the tractor 20. By virtue of such positioning or angular distribution of the stereoscopic camera assemblies 66-1, 66-2, 66-3, the rear perception module 46 combines or cooperates with the front perception module 44 to provide a 360° cumulative FOV for the stereoscopic camera assemblies 66-1, 66-2, 66-3 (or other EDP devices) housed within the perception modules 44, 46, thereby enabling the perception system 22 to provide full coverage monitoring of the surrounding environment of the tractor 22 in essentially all directions.

Figure 10:
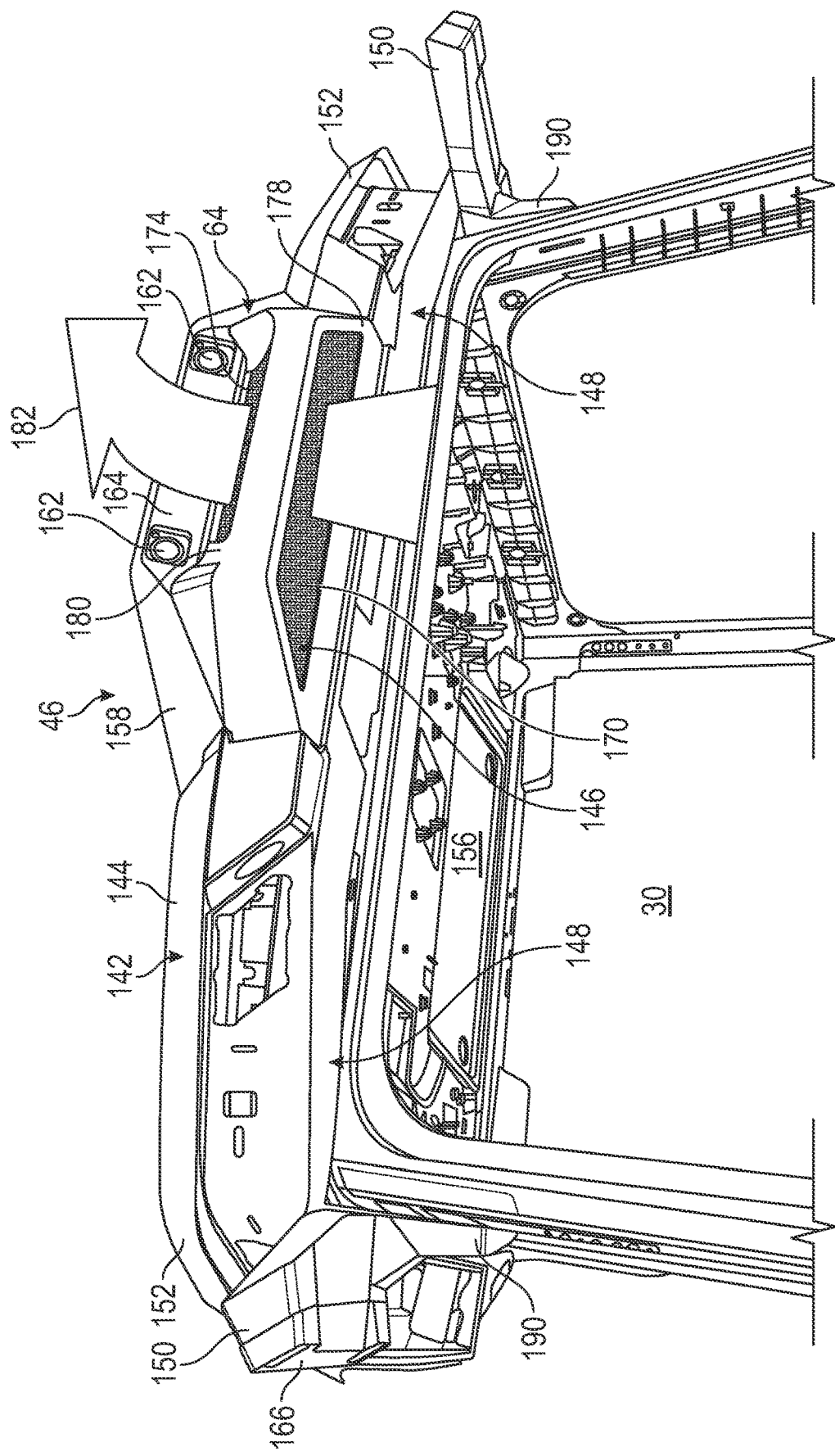
FIG. 10 is a rear perspective view of the cabin roof and the rear perception module illustrating one manner in which airflow may be directed through the rear module housing along one or more cooling airflow paths to dissipate heat generated by at least one heat-generating component (e.g., a VPU) further contained within the rear perception module.

Various grated or screened airflow vents 170, 172, 174, 176 are beneficially formed in exterior walls of the rear module housing 64 at selected locations, which facilitate airflow through the rear module housing 64 along one or more cooling airflow paths. For example, as indicated in FIG. 10, an underside inlet vent 170 may be formed in a lower wall 178 of the rear protruding section 160, while a corresponding outlet vent 174 may be formed in an upper wall 180 of the rear protruding section 160. Further, in this case, the inlet vent 170 may be oriented to receive airflow conducted in a generally upward direction alongside a rear window of the tractor cabin 30, with such rising airflow drawn into the rear protruding section 160 through the underside inlet vent 170 and then discharged through the outlet vent 174 after being conducted through the rear protruding section along a first cooling airflow path (indicated in FIG. 10 by an arrow 182). Additionally or alternatively, rear perception module 46 may be fabricated to include a ram inlet vent 172, which is formed in a raised upper or topside surface 184 of the rear module housing 64. The raised topside surface 184 of the rear module housing 64 projects upwardly from the upper surface or topside 154 of the cabin roof 142 and has an angled surface in which the ram inlet 172 is formed to intake ram airflow as the tractor 20 travels in a forward direction. This airflow may be conducted along a second cooling airflow path before discharge from the rear module housing 64 through an associated outlet vent 176, as indicated FIG. 8 by an arrow 186.

In at least some embodiments of the rear perception module 46, one or more of the heat-generating components 54 may be positioned in or adjacent the cooling airflow paths 182, 186 such that excess heat generated by the heat-generating component(s) 68 is dissipated by convective transfer to airflow conducted along the cooling airflow paths 182, 186 during operation of the rear perception module 46. As noted above, the heat-generating component 68 may be visual processing circuitry, such as a VPU, electrically coupled to the EDP devices 66 when assuming the form of stereoscopic camera assemblies; with the VPU (or other heat-generating component 68) at least partially positioned in the rear protruding section 160 of the rear module housing 64 to maximize exposure to the cooling airflow directed along the cooling airflow paths 182, 186. Thus, in effect, the rear module housing 64 may serve as a flowbody or duct member in which the heat-generating component 68 (e.g., VPU or other visual processing circuitry) is located and through the cooling airflow paths 182, 186 pass to provide efficient dissipation of excess heat generated by the component 68. A highly efficient heat dissipation scheme is thus provided to convectively cool heat-generating components contained within the rear perception module 46 for enhanced thermal performance, even in the absence of fans or other active cooling mechanisms within the module 46. The performance of the housed EDP sensors (e.g., the stereoscopic camera assemblies 66-1, 66-2, 66-3) may be optimized as a result, while the overall complexity, cost, and part count of the rear perception module 46 is minimized.

Finally, various other features or devices may also be included in the rear perception module 46, such as a wireless receiver 188 and mounting features 190, 192. In the illustrated example, such mounting features 190, 192 include door hinge point attachments 190 and window glass hinge point clips 192 (FIG. 7) sized, shaped, and positioned to interface with the infrastructure of the tractor cabin 30. By virtue of integration into the trailing edge portion of the cabin roof 30 in this manner, the rear perception module 46 provides relatively little, if any obstruction of operator sightlines through the rear cabin windows. Concurrently, the rear perception module 46 provides adequate EDP device elevation to provide sensor sightlines over and around various implements or machines that may be towed by the tractor 22 at different junctures in time. Finally, as noted above, the manner in which the rear perception module 46 spans the width of the tractor cabin roof 142, with sensor housing compartments provided in the rear protruding section 160 and the enlarged terminal end sections 166, 168 enables optimal positioning of the EDP devices (e.g., the stereoscopic camera assemblies 66-1, 66-2, 66-3) to achieve a relatively wide angle cumulative FOV of the rear EDP sensor system 66, 68, 70 approaching or exceeding 180° in embodiments. When combined with a front perception module likewise providing such a broad FOV approaching or exceeding 180°, such as the front perception module 44 described above in connection with FIGS. 1-6, the cumulative FOV of EDP devices 52 included in the work vehicle perception system 22 can provide complete, 360° coverage to of the environment surrounding the tractor 20.

Figure 11:
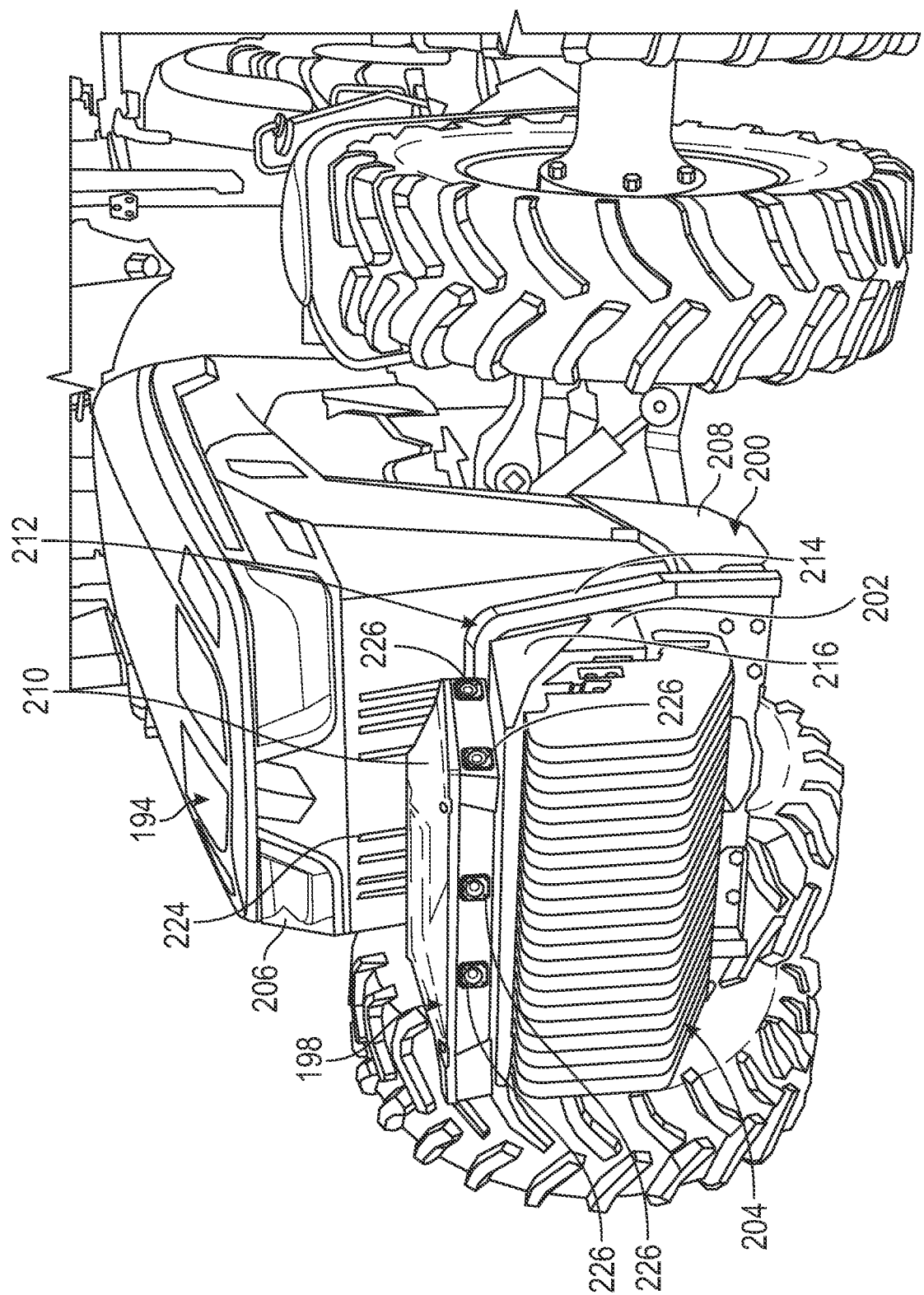
FIGS. 11 and 12 are front and side perspective views, respectively, of a work vehicle (again, a tractor) equipped with a work vehicle perception system including a front perception module, as presented in accordance with a further example embodiment of the present disclosure.
Figure 12:
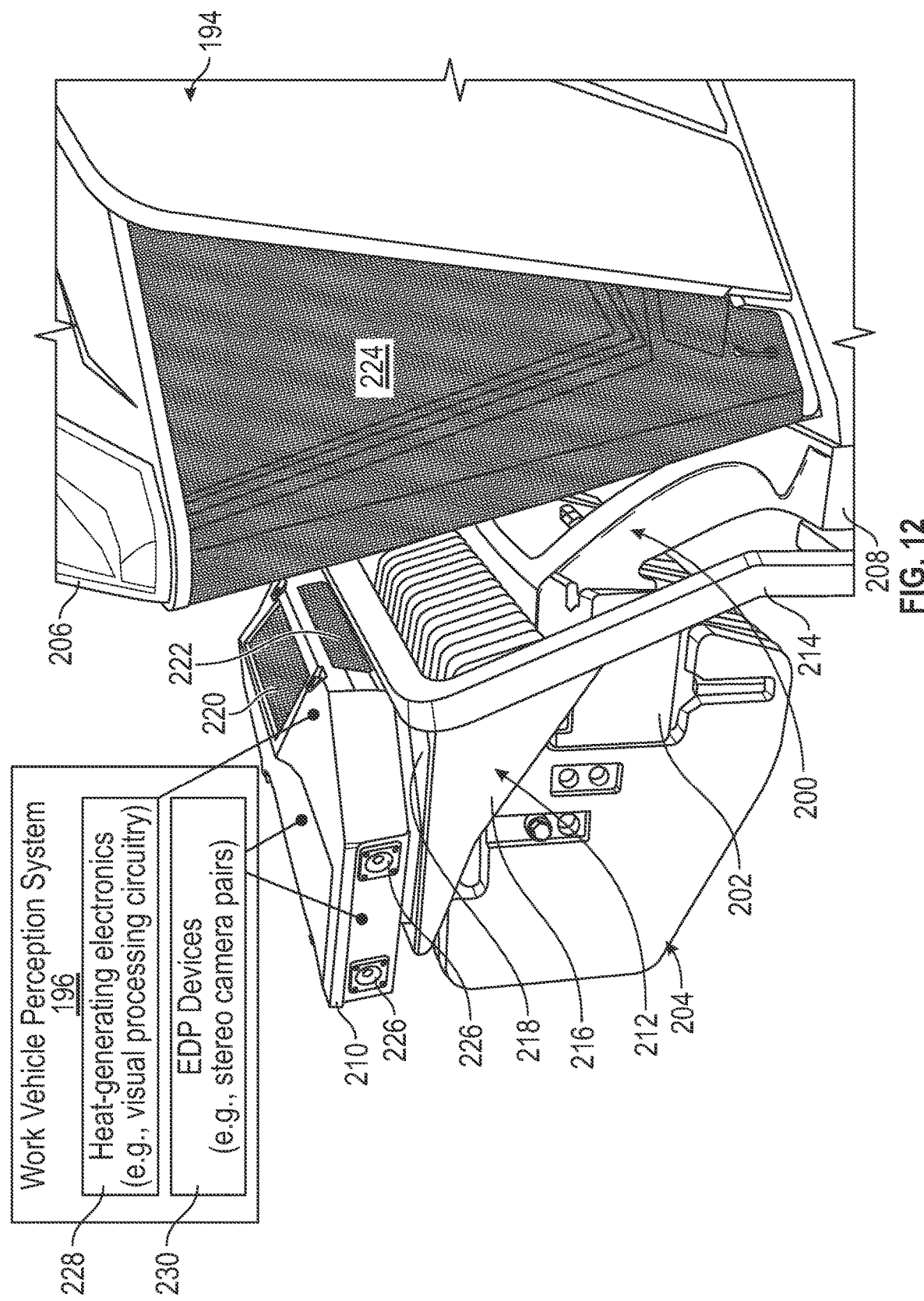

Additional Example Embodiments of the Front Perception Module and Associated Structure Referring now to FIGS. 11 and 12, a work vehicle in the form of a tractor 194 is equipped with a work vehicle perception system 196 (identified in FIG. 12, hereafter "tractor perception system 196"), as presented in accordance with a further example embodiment of the present disclosure. As was previously the case, the tractor perception system 196 includes a front perception module 198, which is positioned adjacent a front ballast system 200 and which is joined to the tractor chassis; e.g., the front perception module 198 may be joined to the tractor chassis through the front ballast system 200 in at least some embodiments. In addition to the front perception module 198 and the componentry therein, the tractor perception system 196 may also potentially include a rear perception module, which may be similar to or, perhaps, substantially identical to the rear perception module 46 shown in FIGS. 1 and 7-10. In other embodiments, the tractor perception system 196 may include additional perception modules mounted to other portions of the tractor 194 or may lack any additional perception modules beyond the front perception module 198.

The electronic components contained within the front perception module 198 may also be similar, if not substantially identical to those described above in connection with the front perception module 44. Accordingly, the electronic components within the front perception module may include a number of EDP devices 230 and, perhaps, other heat-generating electronics 228 (that is, IC dies or other electronics prone to excess heat generation during operation) electronically coupled to the EDP devices 230. As discussed at length above, such the EDP devices 230 can assume the form of radar, lidar, and sonar-based sensors, which emit energy pulses and measure pulse reflections utilizing transducer arrays to estimate the proximity of various objects and surfaces located within the surrounding environment of the tractor 194; however, the EDP devices 230 beneficially assume the form of stereoscopic camera assemblies or "stereo camera pairs" for the reasons previously discussed and will thus be principally described below as such. Further, the heat-generating electronics 228 may include processing units or devices (e.g., populated circuit or wiring boards to which at least one IC die is attached and encompassed by the term "VPU" herein) for processing visual imagery provided by the EDP devices 230 when assuming the form of stereo camera pairs. Additional description of one manner in which such EDP devices 230 may be distributed about the front perception module 198 to cumulatively provide a relatively broad FOV is set-forth below. First, however, the front ballast system 200 of the example tractor 194 is discussed in greater detail to establish a non-limiting example context in which embodiments of the present disclosure may be better understood.

In a manner similar to the front ballast system 26 included in the example tractor 20 shown in FIGS. 1-6, the front ballast system 200 includes a laterally-extending hanger bracket 202 and a lower structure or "connecting yoke" joining the hanger bracket 202 to the tractor chassis. The connecting yoke 208 is best shown FIG. 12 and may assume the form of two arms integrally formed with the hanger bracket 202, extending downwardly therefrom, and having lower flanged ends, which are bolted, welded, or otherwise securely affixed to a lower leading portion of the tractor chassis. In other embodiments, the connecting yoke 208 may assume a different structural form suitable for securely joining the laterally-extending hanger bracket 202 to the tractor chassis. Comparatively, the laterally-extending hanger bracket 202 assumes the form of a laterally-elongated beam-like structure onto which a selected number of ballast weights 204 may be loaded and removed by an operator. The laterally-extending hanger bracket 202 enables positioning of a number of the removable ballast weights 204 beneath a front module housing 210 of the front perception module 198, with the hanger bracket 202 and, more generally, the front ballast system 26 shown in a fully-loaded state in FIGS. 11 and 12. In still further implementations, various other structural attachment schemes may be utilized to join the laterally-extending hanger bracket 202 to the tractor chassis, while positioning the front perception module 198 relative to the hanger bracket 202, providing that the front module housing 210 is securely affixed to the tractor chassis at a location above the hanger bracket 202 in a manner enabling at least a subset of the removable ballast weights 204 to be positioned beneath the module housing 210.

Any physical interface between the laterally-extending hanger bracket 202 and the removable ballast weights 204 can be provided enabling the ballast weights 204 to be selectively loaded onto and removed from the hanger bracket 202, as appropriate, to best suit operator preferences or a particular application performed utilizing the tractor 194. For example, as can be seen most readily in FIG. 12, the removable ballast weights 204 may be imparted to have C-shaped slots or openings along their trailing or back edges, with the laterally-extending hanger bracket 202 having a corresponding (e.g., a rotated T-shaped) geometry permitting the ballast weights 204 to be slid laterally onto the hanger bracket 202 and subsequently confined to lateral movement along the hanger bracket 202, as previously described. A particular ballast weight 204 may be retained in a given lateral position by frictional forces, by abutment against neighboring ballast weights 204, utilizing an elongated bolt extending laterally through aligning openings in the ballast weights 204, by engagement into indexing slots provided along the hanger bracket 202, or in another manner. Various other constructions or designs enabling an operator to selectively load the ballast weights 204 onto and remove the ballast weights 204 from the hanger bracket 202 are also possible in further implementations, with at least some, a majority, or perhaps all of the ballast weights 204 positioned beneath the front perception module 198 when the hanger bracket 202 is fully loaded as shown.

In addition to the front module housing 210, the front ballast system 200 further contains a lower attachment structure or mounting base 212. In this particular example, the mounting base 212 includes an attachment railing or bracket 214 and a shelf structure or module support platform 216. The module support platform 216 includes, in turn, a substantially flat, horizontally-oriented support surface 218 (FIG. 12) extending over and above the laterally-extending hanger bracket 202. In embodiments, the support surface 218 may span at least a majority, if not the entirety of the hanger bracket 202, as taken in a width direction along which the hanger bracket 202 is elongated. The front module housing 210 is positioned above, supported by, and mounted to the support surface 218 of the module support platform 216; e.g., in at least some embodiments, the front module housing 210 may seat on the module support platform 216, with fastener openings provided through the module support platform 216 to accommodate bolts or fasteners (hidden from view) attaching the front module housing 210 to the module support platform 216. In alternative embodiments, the front module housing 210 may be mounted to the module support platform 216 in another manner.

The attachment bracket 214 of the mounting base 212 extends downwardly from each side of the module support platform 216 to attach to the tractor chassis, whether directly or through the lower structure or connecting yoke 208 of the front ballast system 200. In the illustrated example, the attachment bracket 214 is fabricated from square tubing formed into an inverted, substantially U-shaped structure, with the lower terminal end of each arm of the U-shaped structure affixed to the tractor chassis through the front ballast system 200. The support platform 216 may be joined to the attachment bracket 214 in a manner not intended for in-field operator removal, such as by welding; or, instead, in a manner permitting ready operator removal, such as utilizing bolts or other fasteners. In at least some instances, an operator may temporarily remove the front module housing 210 or a portion of the front module housing 210 to allow interchange of the modular ballast weights 204 on the laterally-extending hanger bracket 202. This may not be the case in other embodiments when, for example, the mounting base 212 of the front ballast system 200 does not physically obstruct ballast weight insertion onto and removal from the laterally-extending hanger bracket 202. Lastly, one or more non-illustrated inlet vents may be formed in the bottom surface of the front module housing 210 for the intake of airflow in certain embodiments, particularly if corresponding openings are cut into or otherwise formed in the support platform 216.

A number of airflow ports 220, 222 is formed through the exterior walls of the front module housing 210; and, the illustrated example, specifically, at least two airflow ports 220, 222 are formed in the rear-facing and upper rear walls of the front module housing 210. Again, perforated plates or screen pieces may be positioned across the airflow ports 220, 222 to permit airflow, while blocking larger particulate matter or debris from entering the front module housing 210. As the airflow ports 220, 222 are formed in a rearward or trailing portions of the front module housing 210, which is mounted above the front ballast system 200, the airflow ports 220, 222 are located adjacent and generally face the forward grille 224 of the tractor 194. By virtue of such positioning, when the radiator fan contained in the tractor 194 is active (analogous to the radiator fan 40 of the tractor 20, FIG. 1), the action of the radiator fan draws airflow through the front module housing 210 to provide enhanced cooling and heat dissipation of electronic components contained in the module housing 210. The tractor radiator fan 40 may thus be leveraged to increase cooling of the electronic components 228 (e.g., a VPU or similar visual processing circuitry in implementations in which the EDP devices 230 assumes the form of stereo camera pairs) contained within the front module housing 210 and prone to excess heat generation. Further, such heat-generating components 228 may be strategically positioned within or adjacent the paths along which cooling airflow is conducted when flowing between the airflow ports 220, 222 or otherwise flowing through the front module housing 210.

As generally indicated in FIG. 12 and discussed above, the front module housing 210 may also contain visual processing circuitry or other heat-generating electronic components 228, such as a VPU, electrically coupled to the stereo camera pairs (or other EDP devices 230) contained in the module housing 210. As described throughout this document, such visual processing circuitry (e.g., implemented as one or more IC dies mounted to a printed circuit or wiring board) is often prone to excess heat generation and is thus advantageously positioned toward a rear central portion of the front module housing 210 to maximize exposure to cooling airflow traveling between the airflow ports 220, 222; e.g., in embodiments, such the visual processing circuitry may be positioned to the rear of the forward-looking stereo camera pair at a location adjacent or beneath the airflow port 220. The front perception module 198 thus provides improved heat dissipation of components contained within the EDP sensor system to prolong service life and promote optimal operation of vital electronic components, such as any visual processing components contained within the EDP sensor system. Signal communication between the EDP sensors (e.g., stereoscopic camera assemblies) contained in the front module housing 210 may occur over wireless connections in embodiments; while, in other instances, non-illustrated wires or cables may be routed from the front module housing 210 to a suitable location of the tractor 194 in some manner, such as by routing such wires through the inner channels of the attachment bracket 214 when formed from tubing.

The mounting scheme employed by the front perception module 198 allows the front perception module 198 to be readily joined to the tractor 194 by retrofit installation, as desired. In this regard, an operator or owner of the tractor 194 can install the front perception module 198 over the front ballast system 200; or mounting of the front perception module 198 may be performed during original equipment manufacture through joinder of the attachment bracket 214 to the tractor chassis by, for example, bolting the lower flanged ends of the connecting yoke 208 of the front ballast system 200, as previously discussed. In other implementations, various other mounting schemes may be employed providing that at least some portion (e.g., the mounting base) of the front perception module 198 is joined to the tractor chassis (e.g., through the front ballast system 200), while vertically spacing the front perception module housing 210 and the support platform 216 above the laterally-extending hanger bracket 202 of the front ballast system 200 to enable positioning of the removable ballast weights 204 beneath the module housing 210. In addition to providing a robust physical mounting to the tractor chassis through the front ballast system 200, the illustrated embodiments further positions the front perception module 198 at a generally optimal ground height or vertical elevation to minimize exposure of the electronics within the front perception module 198 to dust and debris, while avoiding obstruction of operator sightlines when tractor 194 is piloted by a human operator. Concurrently, the EDP devices (e.g., stereo camera pairs) 230 within the front module housing 210 are positioned at a forwardmost point of the tractor 194 and combine to provide a broad cumulative sensor FOV approaching, if not exceeding 180° to provide full, comprehensive coverage of the environmental regions to the front of the tractor 198, as previously described.

As previously indicated, the front module housing 210 contains one or more EDP devices 230 (FIG. 12) and, potentially, may further contain any number of additional sensors and processing components. In the illustrated embodiment, specifically, the front module housing 210 contains multiple EDP devices, which are positioned within the module housing 210 such that the respective FOVs of the EDP devices 230 are angularly spaced or distributed about the forward and lateral sides of the module housing 210. As was previously the case, such EDP devices 230 may include a forward-looking stereoscopic camera assembly or stereo camera pair having a forward-centered FOV extending from the front perception module 198 in principally a forward direction; a first lateral-looking stereo camera pair having a corresponding FOV extending from the front perception module 198 in a first lateral direction and perhaps angled forward of the tractor 194 to some degree; and a second lateral-looking stereo camera pair having a corresponding FOV extending from the front perception module 198 in a second lateral direction opposite the first lateral direction.

Such stereo camera pair are largely hidden from view in FIGS. 11-12; however, the LOS openings or apertures 226 formed through the sidewalls and leading wall of the front module housing 210, which provide the stereo camera pairs with the requisite sightlines of the environment to the front and generally to the sides of the tractor 194, can be seen. Collectively, the individual, overlapping FOVs of the EDP devices 230 cooperate to yield a cumulative forward-centered FOV approaching, if not exceeding 180°. In this manner, the tractor perception system 196 achieves full, comprehensive coverage of the environmental regions to the forward, forward-right (from an operator's perspective), and forward-left (from an operator's perspective) regions of the tractor 198. In embodiments in which the tractor perception system 196 further contains a rear perception module likewise providing a rear-centered angular field of view of 180° or greater, the tractor perception system 196 may be capable of monitoring the entire surrounding envelope or 360° external environment of the tractor 194.

Figure 13:
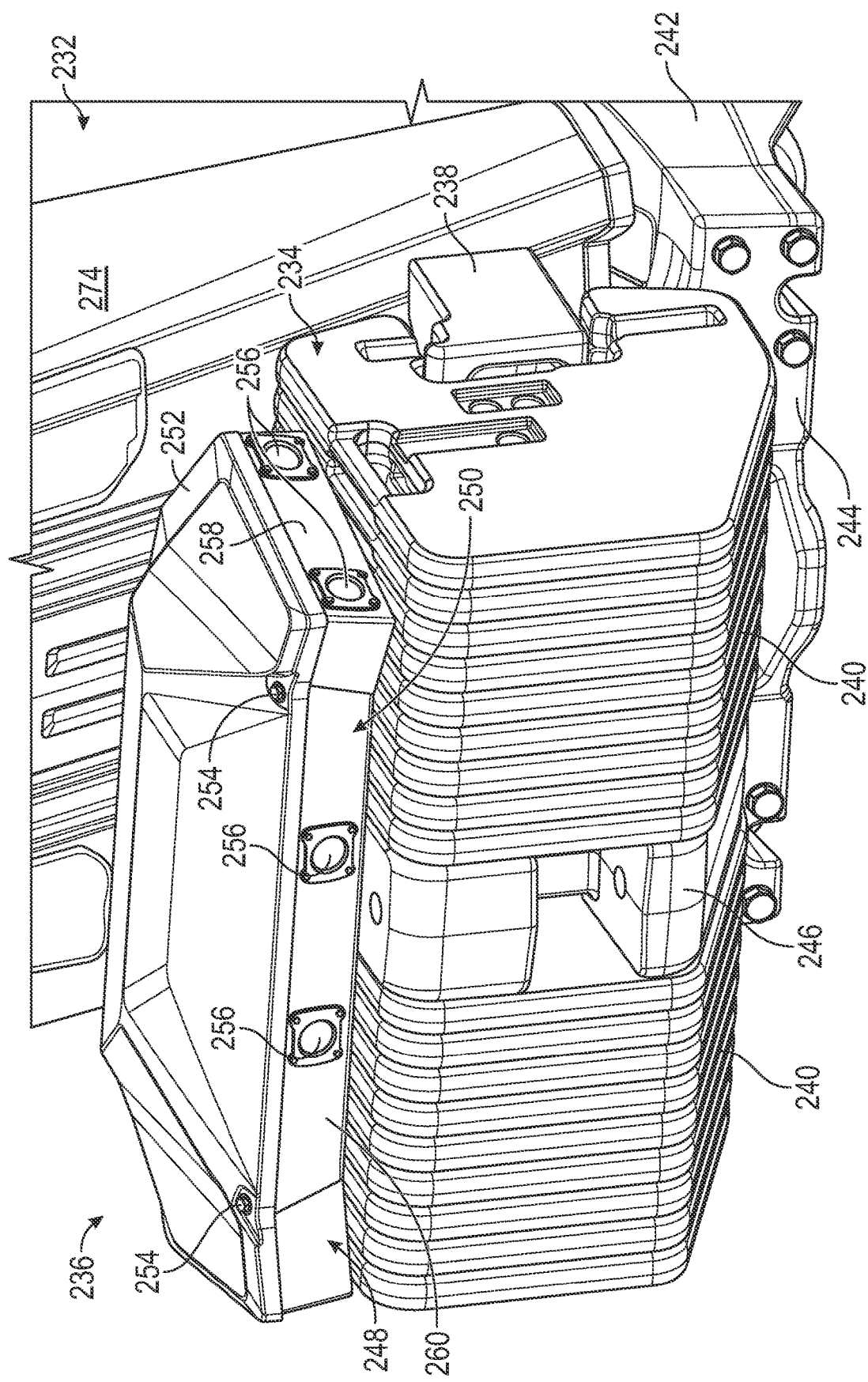
FIGS. 13 and 14 are front and side views, respectively, of a tractor equipped with a work vehicle perception system including a front perception module, as presented in accordance with a still further example embodiment of the present disclosure.
Figure 14:
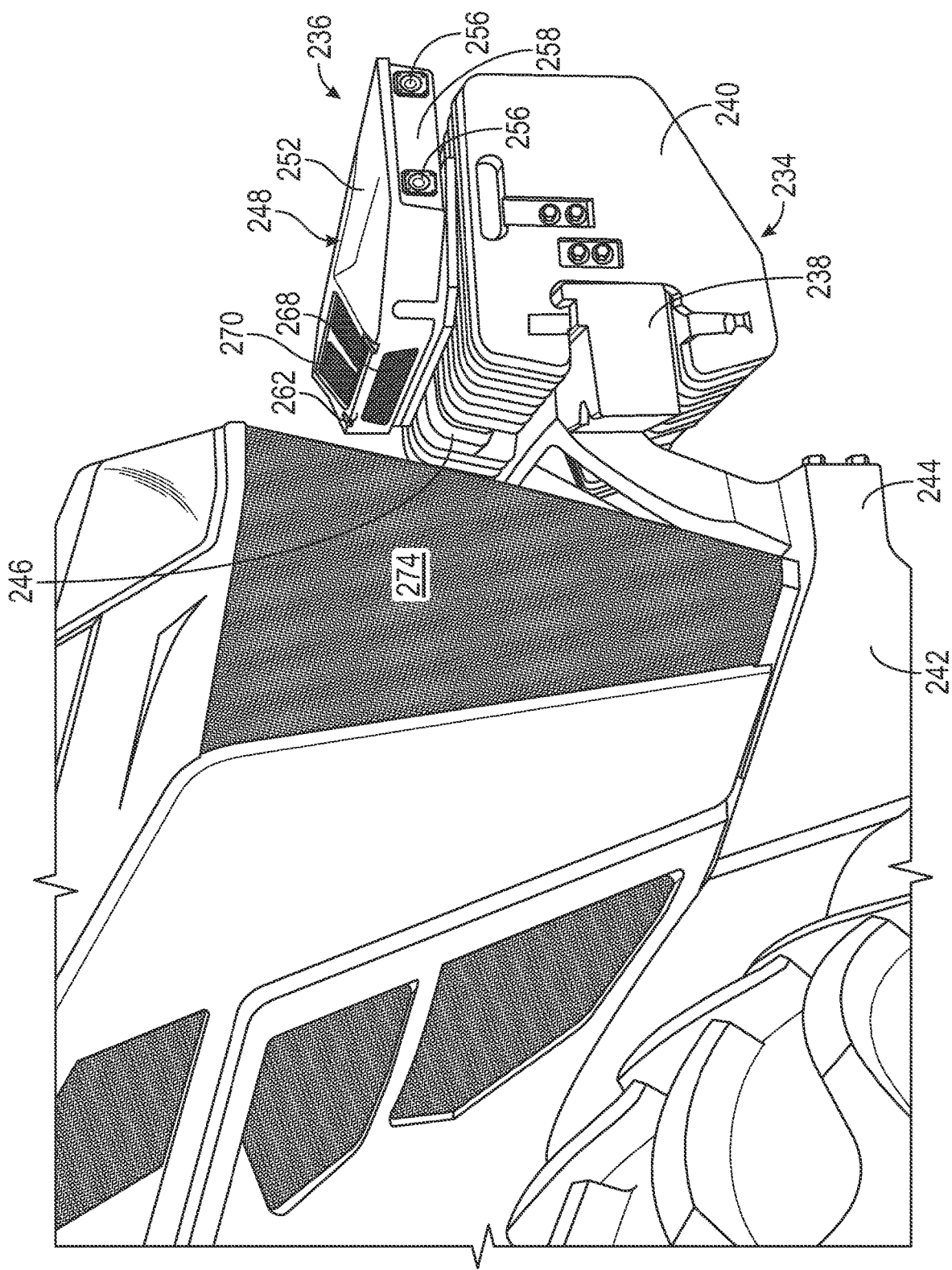

Referring now to FIGS. 13 and 14, a tractor 232 (partially shown) is equipped with a front ballast system 234 and a front perception module 236, as illustrated in accordance with a further example embodiment of the present disclosure. As was previously the case, the front ballast system 234 includes a laterally-extending hanger rack or bracket 238, which supports a number of removable ballast weights 240 when loaded onto the hanger bracket 238 and positioned beneath the front perception module 236. The laterally-extending hanger bracket 238 is bolted or otherwise joined to a chassis 242 of the tractor 232 via a twin mounting arms 244, as shown most clearly in FIG. 14. Once again, the removable ballast weights 240 are realized as suitcase-type weights (that is, each ballast weight 240 has a generally rectangular profile and includes an upper handle), but can assume other forms in further embodiments. Further, as previously described, the laterally-extending hanger bracket 238 may be imparted with a T-shaped or L-shaped profile (including an upwardly-projecting ridge or longitudinal key), which matingly engages corresponding slot features (e.g., longitudinal keyways) formed in the trailing edges portions of removable ballast weights 240 when slid onto the hanger bracket 238 to help retain the ballast weights 240 in their desired positions.

A block-shaped central support structure 246 is integrally formed with or otherwise rigidly joined to a mid-portion of the laterally-extending hanger bracket 238. As shown, the central support structure 246 may be imparted with a profile substantially matching that of the removable ballast weights 240; however, this need not be the case in all instances. In embodiments, the central support structure 246 may be integrally formed with the laterally-extending hanger bracket 238 as a single piece or structure, such as a single cast and machined part. In other instances the central support structure 246 may be independently fabricated and joined to the hanger bracket 238 utilizing hardware (e.g., fasteners or clamp mechanisms), via welding, or in another manner. When present, the central support structure 246 may serve as, or help form, a mounting base through which a front module housing 248 of the front perception module 236 is rigidly joined to the tractor chassis 242. Regardless of the particular manner in which the front module housing 248 is mounted to the tractor chassis 242, the front module housing 248 is beneficially positioned at a location above the laterally-extending hanger bracket 238 to allow the positioning at least a subset of the removable ballast weights 240 beneath the module housing 248 and, further, to position the trailing edge or face of the front module housing 248 adjacent the front grille 274 of the tractor 232.

The front module housing 248 is advantageously imparted with a relatively low profile, aerodynamically streamlined formfactor to minimize obstruction of the tractor grille 274 and thereby reduce, if not eliminate any material impact of the front perception module 236 on vehicle cooling; that is, on the ability of the tractor 232 to efficiently dissipate excess heat generated by, for example, an internal combustion engine housed with the tractor's engine compartment. Although the dimensions and formfactor of the front module housing 248 will vary between embodiments, the front module housing 248 will often span least a majority, if not the substantiality of the width of the laterally-extending hanger bracket 238, as seen looking downwardly on the front perception module 236. Such dimensioning facilitates optimal sightline positioning of EDP sensors (e.g., stereo camera pairs) around the internal periphery of front module housing 248, while allowing the cooling fin array of the below-described VPU assembly to be imparted with a relatively expansive width to increase the surface area availed for heat transfer to the cooling airflow directed through the front module housing.

Figure 15:
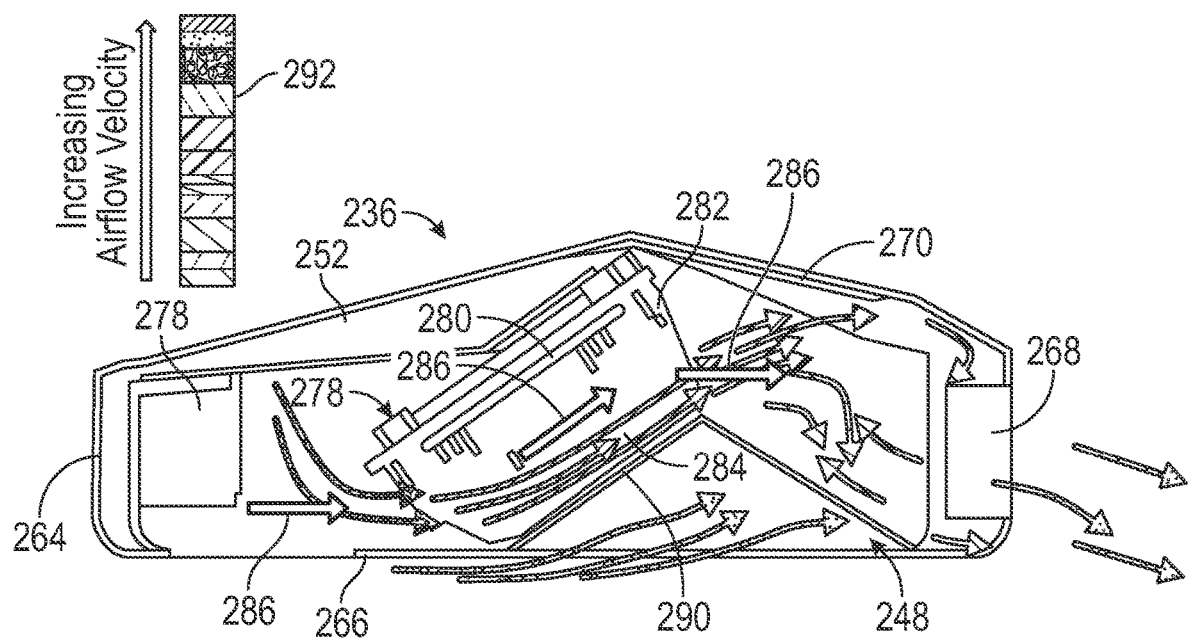
FIG. 15 is an airflow velocity simulation including streamlines indicating one manner in which airflow conducted through the front perception module in a fore-aft direction may pass over the cooling fin array of a VPU assembly, which is mounted within the module housing in an inverted (fins down) and angled or tilted orientation.
Figure 16:
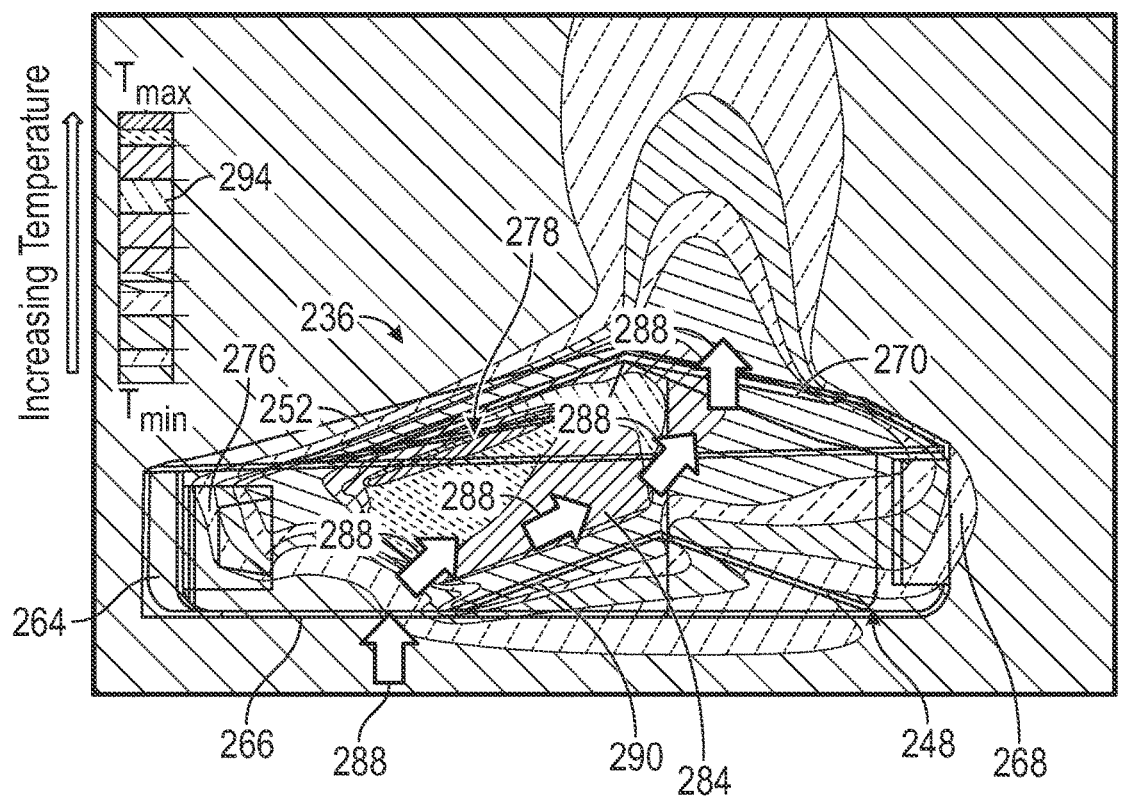
FIG. 16 is a thermal gradient simulation illustrating an example temperature distribution as rising airflow is passively conducted through the front perception module in a generally upward direction when, for example, the tractor is stationary and the tractor's radiator fan is inactive.

With continued reference to example embodiment shown in FIGS. 15 and 16, the front module housing 248 is assembled from two primary pieces or components: a lower housing piece 250 and an upper cover piece 252, which may be joined to the lower housing piece 250 utilizing bolts 254 or other fasteners. Regardless of the particular construction of the front module housing 248, multiple EDP sensors, and possibly other sensors and electronic devices, are installed within the module housing 248. In this particular example, the EDP sensors assume the form of stereoscopic camera assemblies or "stereo camera pairs'"; however, other EDP sensors, such as radar, lidar, or sonar-based sensors, can be utilized in combination with or in lieu of stereo camera pairs in alternative implementations of the front perception module 236. The stereo camera pairs are angularly distributed or arranged about an inner periphery of the front module housing 248 to impart the front perception module 236 with a relatively expansive forward-centered FOV; e.g., a forward-centered FOV equal to or greater than 180 degrees, as seen looking downwardly onto the front perception module 236 and the tractor 232. Sensor or camera LOS apertures 256 are formed at selected locations distributed about the side-facing and front-facing peripheral walls 258, 260 of the front module housing 248 to furnish the stereo camera pairs with unobstructed lines-of-sight extending outward from the perception module 236.

Several airflow ports or vents 264, 266, 268, 270 are formed through selected walls of the front module housing 248, including: (i) a leading, forward-facing (ram flow) inlet vent 264 principally formed in the front-facing peripheral wall 260 of the module housing 248; (ii) a lower airflow inlet vent 266 formed in the underside or bottom surface 272 of the front module housing 248 (identified in FIGS. 15 and 16); (iii) a rear-facing outflow vent 268 formed in a trailing peripheral wall 262 of the front module housing 248; and (iv) an upwardly-facing outflow vent 270 formed in an upper trailing roof portion of the upper cover piece 252. Collectively, the airflow vents 264, 266, 268, 270 promote the conduction of cooling airflow through the module housing 248 in at least two general operational scenarios or cooling modes. As appearing herein, the term "mode" utilized in a general sense herein to describe flow behaviors or patterns through the front module housing 248 under different external conditions, noting that the below-described flow behaviors may often occur concurrently, to varying extents, depending upon conditions external to the front perception module 236.

A first cooling mode of the front perception module 236 occurs when airflow is urged through the front module housing 236 in a fore-aft direction; that is, from a point immediately forward of the front module housing 236 to a point immediately rearward of the module housing 236. This may occur when the tractor 232 is traveling in a forward direction at an appreciable rate of speed, in the presence of headwinds, when a radiator fan positioned behind the tractor grille 274 actively draws airflow through the front module housing 248, or in any combination of these scenarios. Such a "fore-aft" cooling mode is described below in connection with FIG. 15. A second cooling mode of the front perception module 236 occurs in the absence of such conditions, such as when the tractor 232 is stationary, the radiator fan is inactive, and strong headwinds are not present. In this case, rising thermal airflow is directed through the front module housing 248 in a generally upward direction; This provides passive cooling of the heat-generating components (e.g., the below-described VPU assembly) within the front module housing 248 when little to no airflow is forced through the front module housing 236 in a fore-aft direction. This "rising airflow" cooling mode is further discussed below in conjunction with FIG. 16. In either instance or cooling mode, the cooling airflow passing through the front module housing 248 is directed over and across one or more heat-generating components within the front module housing 248, such as a VPU assembly or perception controller operably coupled to the stereo camera pairs contained in the front module housing 248.

Turning to FIG. 15, an airflow velocity simulation depicts airflow conducted through the front perception module 236 during the above-described "fore-aft" cooling mode; e.g., when the tractor 232 is traveling in a forward direction, in the presence of headwinds, or when the forward radiator fan of the tractor 232 actively draws airflow through the front module housing 248. In this view, one of the stereo camera pairs 276 within the module housing 248 can be seen along with a VPU assembly 278, which is placed in signal communication with the stereo camera pairs 276 over wired connections. The example VPU assembly 278 includes a circuit board populated with visual processing circuitry 280 (e.g., a motherboard to which at least one IC die, SMDs, or other microelectronic components are mounted), a surrounding housing or casing 282, and a cooling fin array 284. The cooling fin array 284 of the VPU assembly 278 may include one or more rows of parallel-extending fins composed of a thermally-conductive material, such as a copper alloy, an aluminum alloy, or another metal or alloy; the term "cooling fin array," as appearing herein, generally encompassing any arrangement of fin-like structure or projections for convectively transferring heat to the ambient environment, regardless of the geometry of the fins within the cooling fin array 284 and including pin-fin type arrays. The VPU assembly 278 may be elongated in a lateral or width-wise direction of the module housing 248; e.g., the cooling fin array 284 may span at least half, if not the substantial entirety of the width of the front module housing 248 to maximize the surface area of the cooling fin array 284 availed for convective heat transfer to the ambient environment.

The VPU assembly 278 is mounted with the front module housing 248 in a manner inserting the cooling fin array 284 into two overlapping cooling airflow paths. This includes a first cooling airflow path, which generally extends through the front module housing 248 in a fore-aft direction, as represented by arrows 286 (hereafter, "fore-aft airflow path 286"). A second cooling airflow path further extends through the front module housing 248 in a generally upward direction. This cooling airflow path is represented by arrows 288 (FIG. 16) and is referred to below as the "rising airflow path 288." Airflow is principally directed along the rising airflow path 288 when the front module housing 248 functions in the rising airflow cooling mode described below in connection with FIG. 16.

Airflow is principally conducted along the fore-aft airflow path 286 when the front module housing 248 functions in the fore-aft cooling mode. As shown in FIG. 15, the fore-aft airflow path 286 principally extends from the inlet vent 264 formed in the leading wall 264 of the front module housing 248 to the rear outflow vent 268 formed in the rear-facing wall 262 of the module housing 248; although some volume of airflow conducted along the fore-aft airflow path 286 may also be exit the front module housing 248 through the trailing, upwardly-facing outflow vent 270 provided in the upper cover piece 252. As noted above, airflow may be directed along the fore-aft airflow path 286 during forward travel of the tractor 232 or in the presence of strong headwinds to dissipate excess heat generated by the visual processing circuitry 280 of the APU assembly 278. Additionally, due to the proximity of the rear-facing outlet vent 268 to the grille 274 of the tractor 232, airflow is also drawn through the front perception module 236 along the fore-aft airflow path 286 when the tractor radiator fan is activated. In this manner, the radiator fan of the tractor 232 is leveraged to effectively provide active cooling through the front perception module 44, including in embodiments in which the perception module 44 lacks internal fans or other active cooling elements.

As can be seen in FIG. 15, the VPU assembly 278 may be mounted in an inverted or "fins down" orientation such that the cooling fin array 284 generally faces away in a downward direction. Concurrently, the VPU assembly 278 may be mounted in a tilted orientation such that the cooling fin array 284 is angled with respect to a horizontal plane, which extends parallel to the fore-aft or longitudinal axis of the tractor 232. In such embodiments, the VPU assembly 278 may be described as facing in both a downward direction and in a rearward direction toward the tractor 232. The tilt angle of the VPU assembly 278 is advantageously chosen by design to accommodate the aerodynamically streamlined formfactor of the front module housing 248, while optimizing the thermal performance of the VPU assembly 278. Additionally, the cooling fin array 284 may be mounted adjacent and face an internal ramp feature or "ramped flow guidance surface" 290 provided in the front module housing 248, such as an inclined surface turning the airflow in an increasingly upward direction and toward the cooling fin array 284, as discussed below.

By mounting the VPU assembly 278 in an inverted (fins down), angled orientation within the front module housing 248, and by directing cooling airflow along the ramped airflow guidance surface 290 to force a greater volume of airflow against the cooling fine array 284, several benefits are achieved. First, the inverted orientation of the VPU assembly 278 reduces the susceptibility of the cooling fin array 284 to the accumulation of airborne debris or other particulate matter build-up over the outer surfaces of the cooling fin array 284, with gravitational forces and the vibratory forces occurring during operation of the tractor 194 tending to dislodge any such particulate build-up from the fin array 284. This, in turn, enables the cooling fin array 284 and, more generally, the VPU assembly 278 to maintain high thermal performance levels over extended periods of time and during usage in debris-laden ambient environments of the type commonly encountered in, for example, agricultural applications. Second, the angled or titled orientation of the VPU assembly 278, taken in combination with ramped flow guidance surface 290, forms an internal ducting or conduit feature increasing conductive heat transfer from the cooling fin array 284 to the cooling airflow conducted through the module housing 248 along the fore-aft airflow path.

As may be appreciated by reference to the cross-hatched streamline arrows and an airflow velocity scale 292 shown in an upper left portion of FIG. 15, the ramped flow guidance surface 290 turns the airflow conducted along the cooling airflow path 286 increasingly toward the cooling fin array 284, while altering local airflow velocities and vectors to promote convective cooling of VPU assembly 278 and the overall the thermal performance of front perception module 236. Concurrently, the ramped flow guidance surface 290, the cooling fin array 284, and the surrounding surfaces form a flow constriction forcing a greater fraction of the cooling airflow across the cooling fin array 284 than would otherwise occur absent the ramped flow guidance surface 290. As a further benefit, when the front perception module 236 functions in such a fore-aft cooling mode, the high velocity airflow along the fore-aft flow path 286 may further help clean or dislodge any debris trapped in the screening positioned over the underside inlet vent 266 and the upper trailing outlet vent 270 during normal operation of the tractor 232.

Addressing lastly FIG. 16, a thermal gradient model simulates operation of the front perception module 236 under operational conditions in which airflow is principally conducted through the front module housing 248 in a generally upward direction, and to a lesser extent a rearward direction, along a rising airflow path 288. In this case, the rising airflow path 288 generally extends from the bottomside vent 266 upwardly through the front module housing 248 to the trailing, upwardly-facing outflow vent 270, which is formed in an upper trailing roof portion of the upper cover piece 252. In a manner similar to the fore-aft airflow path 286 (FIG. 15), the rising airflow path 288 directs cooling airflow over and across the ramped flow guidance surface 290 and the cooling fin array 284 of the VPU assembly 278 before exiting from the front module housing 248 through the upwardly-facing outflow vent 270. The airflow conducted along this cooling path thus travels in upward and rearward directions when flowing across the inverted cooling fin array 284. When the front perception module operates in such a rising airflow cooling mode, excess heat generated by the circuitry within the VPU assembly 278 is consequently dissipated by transfer to the airflow conducted along the rising airflow path 288. This may be appreciated by comparing temperature gradients adjacent the VPU assembly 278 and along the cooling airflow path 288, as indicated by cross-hatching identified in a thermal scale 294 shown in the upper left of FIG. 16.

Through the provision of the rising airflow path 288 by which airflow taken through the bottomside or underside inlet vent 266 is directed over and across the inverted and rearwardly-tilted cooling fin array 284, effective heat removal from the VPU assembly 278 is maintained. Further, effective heat dissipation is maintained under conditions in which airflow is not actively urged through the front module housing 248 in a fore-aft direction; e.g., when the tractor 232 is stationary, when strong headwinds are absent, and when the tractor radiator fan is inactive. Generally, then, the orientation, positioning, and sizing of the VPU assembly 278, and the provision of both fore-aft and rising cooling flow paths through the front module housing 248 (both passing over and across the inverted VPU assembly 278) optimizes the heat dissipation capabilities and thermal performance of the VPU assembly 278 across essentially all operational scenarios or external conditions of the front perception module 236. Further, in many instances, the front perception module 236 can be produced to lack any internal fans, liquid coolant systems, or other active cooling devices to provide cost savings, reduced complexity, and increased durability, while maintaining sufficient heat dissipation capabilities to cool VPU assembly 278 (and/or similar heat-generating circuitry contained within the front perception module 236) in a highly effective manner.

Enumerated Examples of the Work Vehicle Perception System and Front Perception Modules Examples of the front perception module and the work vehicle perception system are further provided and numbered for ease of reference.

1. In an example embodiment, a front perception module is utilized in conjunction with a front ballast system, which is included in a work vehicle and which has a laterally-extending hanger bracket supporting a number of removable ballast weights. In various embodiments, the front perception module includes an EDP sensor system including a first EDP device having an FOV encompassing an environmental region forward of the work vehicle, a mounting base attached to the work vehicle, and a front module housing containing the EDP sensor system and joined to the work vehicle through the mounting base. The front module housing is positioned over and vertically spaced from the laterally-extending hanger bracket in a manner enabling positioning of the removable ballast weights beneath the front module housing.

2. The front perception module of example 1, wherein the mounting base includes a central support structure joined to a central portion of the laterally-extending hanger bracket, while the front module housing is mounted to the work vehicle through the central support structure.

3. The front perception module of example 1, wherein the EDP sensor system includes at least one heat-generating component electrically coupled to the first EDP device. Additionally, the front perception module further includes: (i) an inlet vent formed in a first exterior wall of the front module housing; (ii) an outlet vent formed in a second exterior wall of the front module housing; (iii) a cooling airflow path extending through the front module housing from the inlet vent to the outlet vent, the heat-generating component positioned in or adjacent the cooling airflow path.

4. The front perception module of example 3, wherein the first EDP device includes a stereoscopic camera assembly. The heat-generating component includes or assumes the form of a visual processing unit (VPU) assembly electrically coupled to the stereoscopic camera assembly.

5. The front perception module of example 4, wherein the VPU assembly includes a cooling fin array, while VPU assembly mounted in the front module housing in an inverted and tilted orientation such that the cooling fin array faces in downward and rearward directions.

6. The front perception module of example 5, further including a ramped flow guidance surface within the front module housing and over which the cooling airflow path extends, the cooling fin array disposed adjacent and facing the ramped flow guidance surface.

7. The front perception module of example 3, wherein the inlet vent is formed in a leading wall of the front module housing and oriented to receive ram airflow into an interior of the front module housing as the work vehicle travels in a forward direction.

8. The front perception module of example 3, wherein the inlet vent is formed in a bottom wall of the front module housing and positioned to intake rising airflow into an interior compartment of the front module housing.

9. The front perception module of example 8, further including a thermal chimney extending through the mounting base, the laterally-extending hanger bracket, or both the mounting base and the laterally-extending hanger bracket in a generally vertical direction, the thermal chimney fluidly coupled to the inlet vent formed in the bottom wall of the front module housing.

10. The front perception module of example 3, wherein the work vehicle includes a radiator fan and a grille through which airflow is drawn by action of the radiator fan. Further, the outlet vent is positioned adjacent the grille such that airflow is drawn into the front module housing and through the cooling airflow path by the radiator fan, when active.

11. The front perception module of example 1, wherein the mounting base includes: (i) a first C-shaped mounting flange configured to matingly engage the laterally-extending hanger bracket; and (ii) a second C-shaped mounting flange further configured to matingly engage the laterally-extending hanger bracket and spaced from the first C-shaped mounting flange along a first axis.

12. The front perception module of example 1, wherein the front ballast system has a leading edge, while the front module housing is recessed toward the work vehicle relative to the leading edge of the front ballast system.

13. The front perception module of example 1, wherein the EDP sensor system further includes multiple EDP devices in which the first EDP device is included. The multiple EDP devices are distributed about a peripheral portion of the front module housing to provide a cumulative forward-centered FOV equal to or greater than 180 degrees, as seen looking downwardly onto the work vehicle.

14. The front perception module of example 1, wherein the first EDP device includes a first stereoscopic camera assembly having a line of sight (LOS) extending through one or more apertures provided in a leading wall of the front module housing.

15. The front perception module of example 14, wherein the EDP sensor system further includes: (i) a second stereoscopic camera assembly having an LOS extending through one or more apertures provided in a first sidewall of the front module housing; and (ii) a third stereoscopic camera assembly having an LOS extending through one or more apertures provided in a second sidewall of the front module housing opposite the first sidewall.

CONCLUSION

The foregoing has thus provided front and rear work vehicle perception modules providing various advantages, including thermal performance and structural integration benefits, as well as to work vehicle perception systems containing such modules. Embodiments of the front perception module may be joined to the laterally-extending hanger bracket of a front ballast system (or otherwise coupled to the front ballast system) to provide a rigid attachment to the work vehicle chassis minimizing disturbances forces transmitted the EDP devices (e.g., stereoscopic camera assemblies) contained in EDP sensor system. Additionally, mounting of the front perception module in this manner may provide mechanical protection benefits, particularly as the leading and side edges of the front module housing may be recessed relative to the corresponding edges of the front ballast system. Similarly, mounting or integration of the rear perception module into the rear edge portion of the cabin roof provides various mechanical protection and LOS benefits. Both the front and rear perception modules may further include vent features promoting airflow through the front module housing along cooling airflow paths, both as the work vehicle remains stationary or travels in a forward direction. Heat-generating components, such as a VPU assembly or other visual processing circuitry, may be positioned in or adjacent such cooling airflow paths to promote cooling of such heat-generating components. Additionally, in embodiments, the VPU assembly may be mounted in an inverted orientation, and perhaps a downwardly- and rearwardly-facing orientation, to minimize the build-up of airborne debris or other particulate matter over the cooling fin array of the VPU assembly and to provide other benefits. Embodiments of the front perception module may further be configured to provide a cumulative sensor FOV approaching or exceeding 180° by, for example, strategically positioning multiple (e.g., three) stereoscopic camera pairs (or other EDP devices).

As used herein, the singular forms "a", "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A front perception module utilized in conjunction with a front ballast system included in a work vehicle, the front ballast system having a laterally-extending hanger bracket supporting removable ballast weights, the front perception module comprising:

an environmental depth perception (EDP) sensor system including a first EDP device having a field of view (FOV) encompassing an environmental region forward of the work vehicle;
a mounting base attached to the work vehicle; and
a front module housing containing the EDP sensor system and joined to the work vehicle through the mounting base, the front module housing positioned over and vertically spaced from the laterally-extending hanger bracket in a manner enabling positioning of the removable ballast weights beneath the front module housing.

2. The front perception module of claim 1, wherein the mounting base comprises a central support structure joined to a central portion of the laterally-extending hanger bracket; and
wherein the front module housing is mounted to the work vehicle through the central support structure.

3. The front perception module of claim 1, wherein the EDP sensor system comprises at least one heat-generating component electrically coupled to the first EDP device; and
wherein the front perception module further comprises:
an inlet vent formed in a first exterior wall of the front module housing;
an outlet vent formed in a second exterior wall of the front module housing; and
a cooling airflow path extending through the front module housing from the inlet vent to the outlet vent, the heat-generating component positioned in or adjacent the cooling airflow path.

4. The front perception module of claim 3, wherein the first EDP device comprises a stereoscopic camera assembly; and
wherein the heat-generating component comprises a visual processing unit (VPU) assembly electrically coupled to the stereoscopic camera assembly.

5. The front perception module of claim 4, wherein the VPU assembly comprises a cooling fin array, the VPU assembly mounted in the front module housing in an inverted and tilted orientation such that the cooling fin array faces in downward and rearward directions.

6. The front perception module of claim 5, further comprising a ramped flow guidance surface within the front module housing and over which the cooling airflow path extends, the cooling fin array disposed adjacent and facing the ramped flow guidance surface.

7. The front perception module of claim 3, wherein the inlet vent is formed in a leading wall of the front module housing and oriented to receive ram airflow into an interior of the front module housing as the work vehicle travels in a forward direction.

8. The front perception module of claim 3, wherein the inlet vent is formed in a bottom wall of the front module housing and positioned to intake rising airflow into an interior compartment of the front module housing.

9. The front perception module of claim 8, further including a thermal chimney extending through the mounting base, the laterally-extending hanger bracket, or both the mounting base and the laterally-extending hanger bracket in a generally vertical direction, the thermal chimney fluidly coupled to the inlet vent formed in the bottom wall of the front module housing.

10. The front perception module of claim 3, wherein the work vehicle includes a radiator fan and a grille through which airflow is drawn by action of the radiator fan; and
wherein the outlet vent is positioned adjacent the grille such that airflow is drawn into the front module housing and through the cooling airflow path by the radiator fan, when active.

11. The front perception module of claim 1, wherein the mounting base comprises:
a first C-shaped mounting flange configured to matingly engage the laterally-extending hanger bracket; and
a second C-shaped mounting flange further configured to matingly engage the laterally-extending hanger bracket and spaced from the first C-shaped mounting flange along a first axis.

12. The front perception module of claim 1, wherein the front ballast system has a leading edge; and
wherein the front module housing is recessed toward the work vehicle relative to the leading edge of the front ballast system.

13. The front perception module of claim 1, wherein the EDP sensor system further comprises multiple EDP devices in which the first EDP device is included; and
wherein the multiple EDP devices are distributed about a peripheral portion of the front module housing to provide a cumulative forward-centered FOV equal to or greater than 180 degrees, as seen looking downwardly onto the work vehicle.

14. The front perception module of claim 1, wherein the first EDP device comprises a first stereoscopic camera assembly having a line of sight (LOS) extending through one or more apertures provided in a leading wall of the front module housing.

15. The front perception module of claim 14, wherein the EDP sensor system further comprises:
a second stereoscopic camera assembly having an LOS extending through one or more apertures provided in a first sidewall of the front module housing; and
a third stereoscopic camera assembly having an LOS extending through one or more apertures provided in a second sidewall of the front module housing opposite the first sidewall.

16. A work vehicle perception system utilized onboard a work vehicle having a work vehicle chassis, the work vehicle perception system comprising:
a front ballast system joined to the work vehicle chassis and having a laterally-extending hanger bracket configured to support a plurality of ballast weights; and
a front perception module, comprising:
a front module housing;
a mounting base coupling the front module housing to the work vehicle chassis through the front ballast system; and
a first plurality of stereoscopic camera assemblies contained in the front module housing and distributed about a peripheral portion of the front module housing to provide a cumulative forward-centered field of view (FOV) equal to or greater than 180 degrees, as seen looking downwardly onto the work vehicle.

17. The work vehicle perception system of claim 16, wherein the first plurality of stereoscopic camera assemblies comprises
a first stereoscopic camera assembly having a line of sight (LOS) extending through one or more apertures provided in a leading wall of the front module housing;
a second stereoscopic camera assembly having an LOS extending through one or more apertures provided in a first sidewall of the front module housing; and a third stereoscopic camera assembly having an LOS extending through one or more apertures provided in a second sidewall of the front module housing opposite the first sidewall.

18. The work vehicle perception system of claim 16, wherein the front perception module further comprises:
   an inlet vent formed in a first exterior wall of the front module housing;
   an outlet vent formed in a second exterior wall of the front module housing;
   a cooling airflow path extending through the front module housing from the inlet vent to the outlet vent; and
   a visual processing unit (VPU) assembly electrically coupled to the first plurality of stereoscopic camera assemblies, contained in the front module housing, and positioned in or adjacent the cooling airflow path.

19. The work vehicle perception system of claim 18, wherein the VPU assembly comprises a cooling fin array, the VPU assembly mounted in the front module housing in an inverted and tilted orientation such that the cooling fin array faces in downward and rearward directions.

20. The work vehicle perception system of claim 16, wherein the work vehicle further comprises:
   a cabin roof; and
   a rear perception module, comprising:
      a rear module housing mounted to a trailing portion of the cabin roof; and
      a second plurality of stereoscopic camera assemblies contained in the rear module housing and positioned to provide a cumulative rear-centered FOV equal to or greater than 180 degrees, as seen looking downwardly onto the work vehicle.

\* \* \* \* \*